(12) United States Patent
Jiang et al.

(10) Patent No.: US 12,200,365 B2
(45) Date of Patent: Jan. 14, 2025

(54) SAMPLE IMAGE ANALYZER, SAMPLE IMAGE ANALYZING METHOD, AND CONTROL METHOD FOR OBJECT STAGE OF SAMPLE IMAGE ANALYZER

(71) Applicant: Shenzhen Mindray Bio-Medical Electronics Co., Ltd., Shenzhen (CN)

(72) Inventors: Bin Jiang, Shenzhen (CN); Bo Ye, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 239 days.

(21) Appl. No.: 17/841,368

(22) Filed: Jun. 15, 2022

(65) Prior Publication Data

US 2022/0408025 A1 Dec. 22, 2022

(30) Foreign Application Priority Data

Jun. 16, 2021 (CN) .......................... 202110669207.8

(51) Int. Cl.
*H04N 23/695* (2023.01)
*G01N 21/13* (2006.01)
*H04N 23/661* (2023.01)
*H04N 23/667* (2023.01)
(Continued)

(52) U.S. Cl.
CPC .......... *H04N 23/695* (2023.01); *G01N 21/13* (2013.01); *H04N 23/661* (2023.01); *H04N 23/667* (2023.01); *H04N 23/67* (2023.01); *H04N 23/80* (2023.01)

(58) Field of Classification Search
CPC .. H04N 23/695; H04N 23/661; H04N 23/667; H04N 23/67; H04N 23/80; H04N 23/60; G01N 21/13; G01N 15/1433; G01N 2015/1006; G01N 15/1425; G01N 2015/1445; G01N 2015/1452; G01N 15/1434; G01N 21/84; G01N 21/01; G01N 2021/0112; G01N 2021/0162
See application file for complete search history.

(56) References Cited

U.S. PATENT DOCUMENTS

2010/0080440 A1\* 4/2010 Yamada ........... G01N 35/00871
  382/133
2015/0185462 A1\* 7/2015 Inomata ............... G02B 21/241
  348/79
(Continued)

*Primary Examiner* — Christopher K Peterson
(74) *Attorney, Agent, or Firm* — Kory D. Christensen

(57) ABSTRACT

Provided are a sample image analyzer and a corresponding method. The sample image analyzer includes: an object stage for supporting a sample carrier; an imaging device for capturing an image of an object in a sample on the sample carrier; a driving device for driving the object stage and the imaging device to move relative to each other; and a control device configured to control the driving device to deliver the sample carrier to a position below the imaging device, control the driving device to drive the object stage and the imaging device to move horizontally relative to each other, and to move vertically relative to each other, control the imaging device to capture, at least during the relative vertical movement, images of the object at different horizontal positions and at different vertical positions, and fuse the images of the object to obtain a target image of the object.

20 Claims, 15 Drawing Sheets

(51) Int. Cl.
*H04N 23/67* (2023.01)
*H04N 23/80* (2023.01)

(56) References Cited

U.S. PATENT DOCUMENTS

2018/0075618 A1\* 3/2018 Lai ..................... H04N 13/275
2021/0350112 A1\* 11/2021 Jenoski ................. G02B 21/24

\* cited by examiner

SAMPLE IMAGE ANALYZER, SAMPLE IMAGE ANALYZING METHOD, AND CONTROL METHOD FOR OBJECT STAGE OF SAMPLE IMAGE ANALYZER

CROSS-REFERENCE TO RELATED APPLICATIONS

This application claims priority benefits of the Chinese Patent Application No. 202110669207.8, entitled "SAMPLE IMAGE ANALYZER, SAMPLE IMAGE ANALYZING METHOD, AND CONTROL METHOD FOR OBJECT STAGE OF SAMPLE IMAGE ANALYZER" and filed on Jun. 16, 2021, the contents of which are incorporated herein by reference.

TECHNICAL FIELD

The disclosure relates to the technical field of medical apparatuses, and in particular to a sample image analyzer, a sample image analyzing method, and a control method for an object stage of the sample image analyzer.

BACKGROUND

A sample image analyzer is an apparatus for analyzing cells or other components in a sample such as blood, body fluid, bone marrow, urine, or a tissue, for example, a cell morphology analyzer or a urine analyzer. The sample image analyzer can automatically load a blood smear, complete cell location and image capturing, and present captured blood cell images to a user, which can replace artificial microscopy to some extent.

At present, in a sample image capturing process of a sample image analyzer, an electric motor firstly drives a blood smear to allow a target position therein to appear within a field of view of an imaging device, and then the electric motor stops, while the imaging device performs focusing and capturing for the sample at the target position to obtain a clear image of the target position; next, the electric motor drives the blood smear again to allow a next target position to appear within the field of view of the imaging device, and then the electric motor stops, while the imaging device performs focusing and capturing for the sample at the next target position to obtain a clear image of the next target position; and the above steps are repeated.

During the sample image capturing process, the electric motor needs to be repeatedly started and stopped to realize locating at a target position, and the imaging device needs to perform focusing on the target position every time before capturing image of the target position, resulting in time-consuming sample image capturing and low overall sample image analyzing efficiency.

SUMMARY

Embodiments of the disclosure provide a sample image analyzer, a sample image analyzing method, and a control method for an object stage of a sample image analyzer for improving sample image analyzing efficiency of the sample image analyzer.

A first aspect of embodiments of the disclosure provides a sample image analyzer, including:
an object stage configured to support a sample carrier;
an imaging device including an objective lens and a camera and configured to capture an image of an object in a sample carried by the sample carrier;
a driving device configured to drive the object stage and the imaging device to move relative to each other;
a control device, which establishes communication connection with the imaging device and the driving device and is configured to control the driving device to deliver the sample carrier to a position below the imaging device, wherein the control device is further configured to: control the driving device to drive the object stage and the imaging device to move horizontally relative to each other to allow at least one object in the sample to appear in a field of view of the imaging device; control the driving device to drive the object stage and the imaging device to move vertically relative to each other; control the imaging device to capture, at least during the relative vertical movement, a plurality of images of the at least one object within the field of view at different horizontal positions and at different vertical positions; and fuse the plurality of images of the at least one object to obtain a target image of the at least one object.

A second aspect of embodiments of the disclosure further provides a sample image analyzer, including:
an object stage configured to support a sample carrier;
a sample imaging device configured to capture an image of an object in a sample carried by the sample carrier;
a mode setting device configured to set one of a first capturing mode and a second capturing mode as an operation mode in which the sample imaging device and the object stage move relative to each other and the sample imaging device performs capturing; and
a control device configured to receive an operation mode instruction of the first capturing mode, control the sample imaging device to capture a plurality of images of a same object at a same horizontal position and at different vertical positions, and fuse the plurality of images of the same object to obtain a target image of the same object; or configured to receive an operation mode instruction of the second capturing mode, control the sample imaging device to capture a plurality of images of at least one object at different horizontal positions and at different vertical positions, and fuse the plurality of images of the at least one object to obtain a target image of the at least one object.

A third aspect of embodiments of the disclosure further provides a sample image analyzer, including:
an object stage configured to support a sample carrier;
a sample imaging device configured to capture an image of an object in a sample carried by the sample carrier;
a mode setting device configured to set one of a third capturing mode and a fourth capturing mode as an operation mode in which the sample imaging device and the object stage move relative to each other and the sample imaging device performs capturing; and
a control device configured to receive an operation mode instruction of the third capturing mode and, when an object within a field of view of the sample imaging device is changed from a first object to a second object, control the sample imaging device and the object stage to stop moving horizontally relative to each other, control the sample imaging device and the object stage to move vertically relative to each other, and control the sample imaging device to capture a plurality of images of the second object during the relative vertical movement; or configured to receive an operation mode instruction of the fourth capturing mode and, when an object in a field of view of the sample imaging device is changed from a first object to a second object, control the sample imaging device and the object stage to continue to move horizontally relative to each other, control the sample imaging device and the object stage to move vertically relative to each other, and control the sample imaging device to capture a plurality of images of the second object during the relative horizontal movement and the relative vertical movement.

A fourth aspect of embodiments of the disclosure provides a sample image analyzing method, including:

delivering a sample carrier holding a sample to a position below an imaging device;

controlling the sample carrier and the imaging device to move horizontally relative to each other to allow an object in the sample to appear in a field of view of the imaging device;

controlling the sample carrier and the imaging device to move vertically relative to each other, and controlling the imaging device to capture, at least during the relative vertical movement, a plurality of images of the object at different horizontal positions and at different vertical positions; and fusing the plurality of images of the object to obtain a target image of the object.

A fifth aspect of embodiments of the disclosure provides a control method for an object stage of a sample image analyzer, including:

controlling a driving device of the sample image analyzer to deliver a sample carrier supported by the object stage to a position below an imaging device of the sample image analyzer; and controlling, in the case where the imaging device does not move, the driving device to drive the object stage to move horizontally, based on a first movement parameter, to allow an object in the sample carrier to appear in a field of view of the imaging device, and controlling the driving device to drive the object stage to move vertically, based on a second movement parameter, to allow the imaging device to capture a plurality of images of the object within the field of view at different horizontal positions and at different vertical positions during the relative vertical movement, wherein preferably the first movement parameter includes a movement speed of the object appearing in the field of view of the imaging device and/or a movement speed of the object within the field of view of the imaging device, and the second movement parameter includes a movement distance by which the imaging device moves vertically within the period of time for capturing two consecutive images.

As can be seen from the foregoing technical solutions, the embodiments of the disclosure have the following advantages:

the imaging device of the sample image analyzer of the embodiments of the disclosure can continuously capture images of an object contained in a sample within the field of view during the relative vertical movement between the sample carrier and the imaging device, and then fuse the captured images to obtain a target image of the object. Compared to the prior art, according to sample image analyzer of the embodiments of the disclosure, during the image capturing process, the relative vertical movement process of the sample carrier and the imaging device does not need to be interrupted, and the imaging device does not need to perform focusing, which shortens the period of time for which the sample image analyzer captures a plurality of images for fusion and thus achieves higher working efficiency of the sample image analyzer.

DESCRIPTION OF THE PREFERRED EMBODIMENTS

Embodiments of the disclosure provide a sample image analyzer, a sample image analyzing method, and a control method for an object stage of a sample image analyzer for improving sample image analyzing efficiency of the sample image analyzer.

To make the solutions of the disclosure more comprehensible to those skilled in the art, the technical solutions of the embodiments of the disclosure will be described below clearly and comprehensively in conjunction with the accompanying drawings in the embodiments of the disclosure. Obviously, the embodiments described are merely some of, rather than all of, the embodiments of the disclosure. Based on the embodiments of the disclosure, all the other embodiments which would have been derived by those of ordinary skill in the art without involving any inventive effort shall fall within the scope of protection of the disclosure.

The terms "first", "second", "third", "fourth", etc. in the specification and the claims of the disclosure and the above accompanying drawings are used to distinguish similar objects, and are not necessarily used to describe a specific order or sequence. It should be understood that the terms used as such may be interchangeable where appropriate, such that the embodiments described herein can be implemented in an order other than what is illustrated or described herein. In addition, the terms "include" and "comprise" and any variations thereof are intended to cover non-exclusive inclusion. For example, a process, method, system, product, or apparatus that includes a series of steps or units is not necessarily limited to those steps or units explicitly listed, but may include other steps or units that are not explicitly listed or are inherent to these processes, methods, products, or apparatuses.

A sample image analyzer is configured to analyze cells or formed elements in a sample such as blood, body fluid, bone marrow, urine, or a tissue. For example, the sample image analyzer may be configured to capture images of cells in a blood film on a blood smear and present the images to a user for analysis by the user, and in addition, the sample image analyzer may also be configured to analyze urine components in a counting cell.

Figure 1:
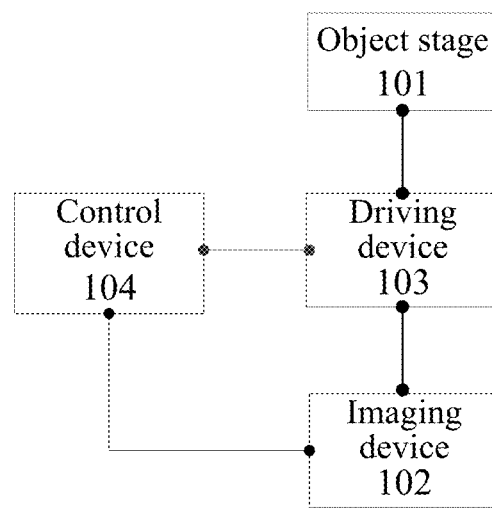
FIG. 1 is a schematic structural diagram of a sample image analyzer according to an embodiment of the disclosure.
Figure 2:
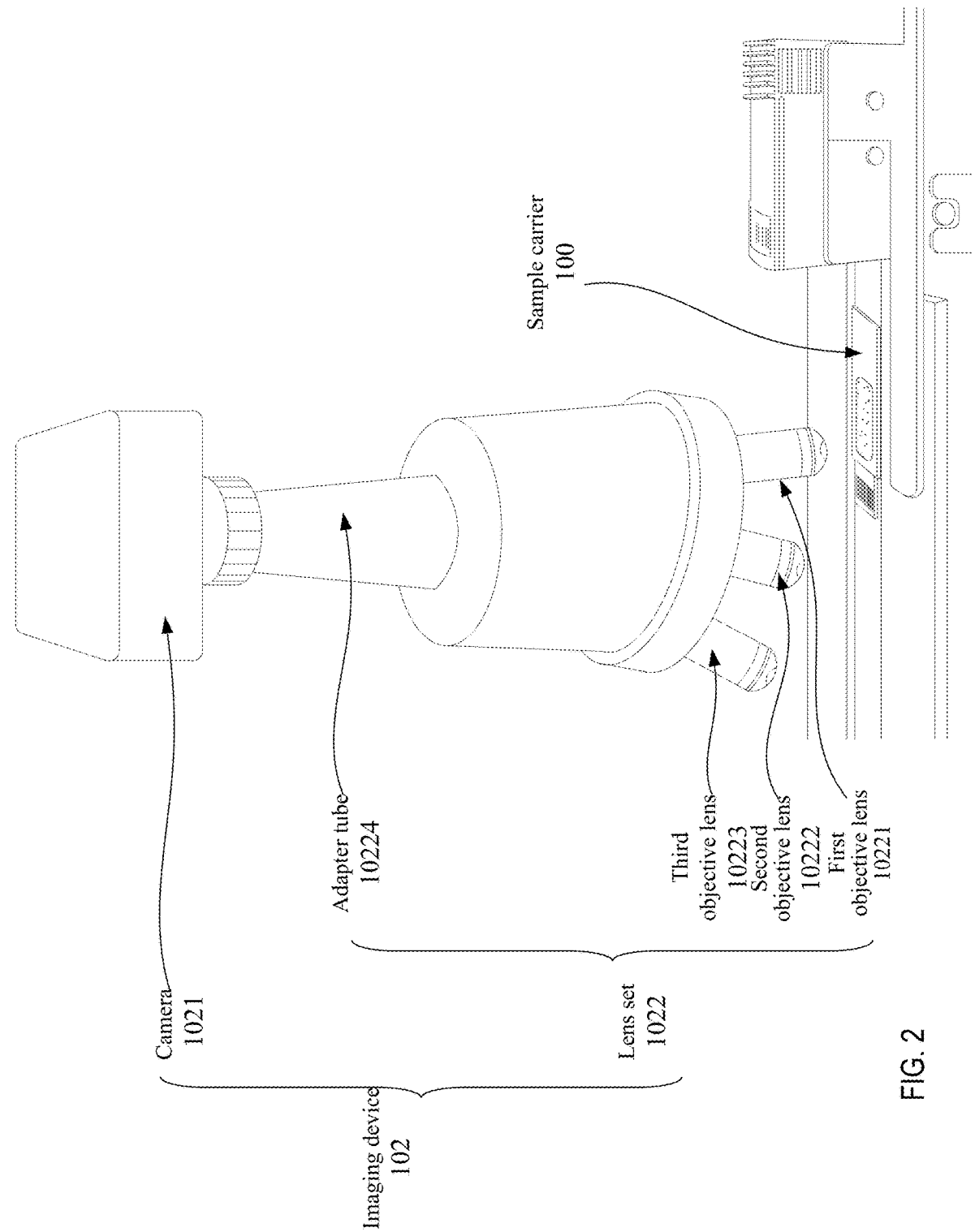
FIG. 2 is a schematic structural diagram of an imaging device and a sample carrier according to an embodiment of the disclosure.
Figure 3:
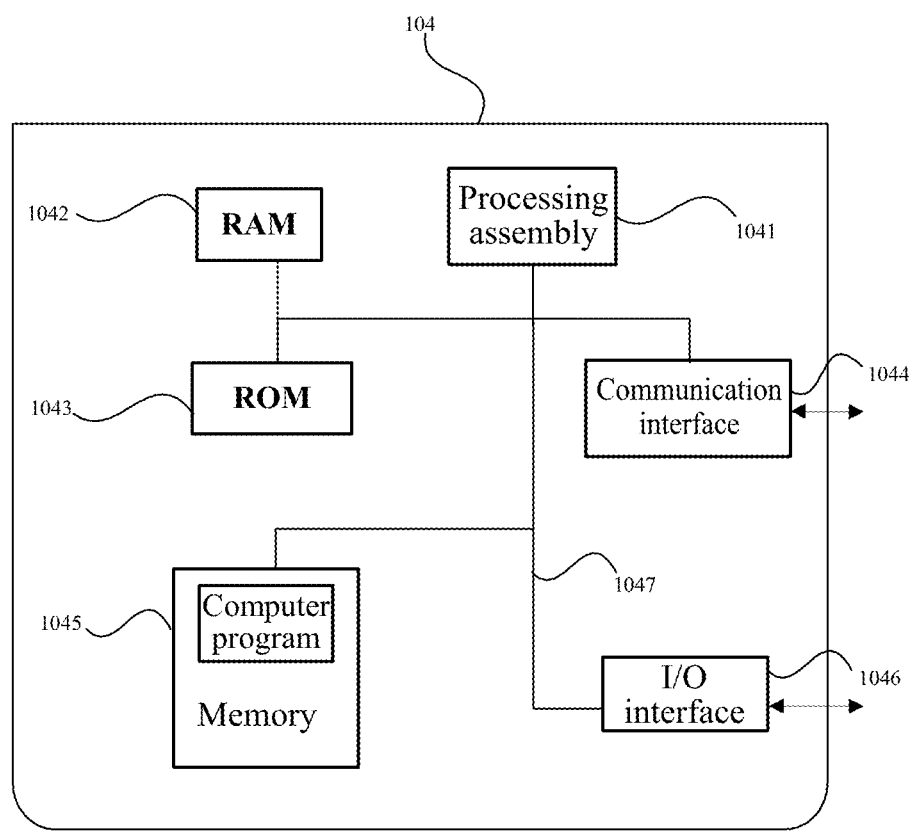
FIG. 3 is a schematic structural diagram of a control device according to an embodiment of the disclosure.

For convenience of understanding, the structure of the sample image analyzer provided by embodiments of the disclosure will be described first. With reference to FIGS. 1, 2 and 3, the sample image analyzer in the embodiments of the disclosure at least includes an object stage 101, an imaging device 102, a driving device 103 and a control device 104.

Specifically, the object stage 101 is configured to support a sample carrier 100, and the imaging device 102 includes a camera 1021 and a lens set 1022 and is configured to perform image capturing for an object in a sample carried by the sample carrier 100. In a specific embodiment, the lens set 1022 may include a first objective lens 10221 and a second objective lens 10222, and may further include a third objective lens 10223 and/or an adapter tube 10224, wherein the first objective lens may be a 10× objective lens, and the second objective lens may be a 40× objective lens or a 100× objective lens. Of course, the lens set may also include only a 40× objective lens or a 100× objective lens. The specific requirements of the objective lenses may be adaptively adjusted according to practical application scenarios, which is not specifically limited herein. FIG. 2 shows a schematic diagram of the imaging device 102 and the sample carrier 100.

In a specific implementation, the driving device 103 includes a horizontal driving component and a vertical driving component, wherein the horizontal driving component is configured to drive the imaging device and the object stage to move horizontally relative to each other, the vertical driving component is configured to drive the imaging device and the object stage to move vertically relative to each other, and the two components may be integrated or may be arranged separately. The horizontal driving component and the vertical driving component may perform synchronous driving, that is, synchronously drive an object to move horizontally and vertically; or may perform asynchronous driving, that is, asynchronously drive an object to move horizontally and vertically. The driving device 103 in this embodiment may drive the object stage 101 to move independently, or may drive the imaging device 102 to move independently, or may also drive the imaging device 102 to move while driving the object stage 101 to move. That is to say, the driving device 103 in the embodiments of the disclosure drives the object stage 101 and the imaging device 102 to move relative to each other, including relative vertical movement or relative horizontal movement, in any of the three driving modes.

As shown in FIG. 3, in a specific implementation, the control device 104 at least includes a processing assembly 1041, an RAM 1042, an ROM 1043, a communication interface 1044, a memory 1045 and an I/O interface 1046, wherein the processing assembly 1041, the RAM 1042, the ROM 1043, the communication interface 1044, the memory 1045 and the I/O interface 1046 communicate via a bus 1047. The control device 104 in this embodiment establishes communication connection with the imaging device 102 and the driving device 103 through the communication interface 1044.

The processing assembly may be a CPU, a GPU, or another chip having a computing capability.

The memory 1045 contains various computer programs (such as an operating system, and an application program) executable by the processor assembly 1041, and data required for execution of the computer programs. In addition, during sample testing, any data that needs to be stored locally may be stored in the memory 1045.

The I/O interface 1046 includes a serial interface such as USB, IEEE 1394, or RS-232C, a parallel interface such as SCSI, IDE, or IEEE 1284, and an analog signal interface composed of a D/A converter, an A/D converter, etc. An input apparatus composed of a keyboard, a mouse, a touch-screen, or another control button is connected to the I/O interface 1046, and a user may directly input data to the control device 104 by using the input apparatus. In addition, the I/O interface 1046 may be further connected to a display having a display function, such as a liquid crystal screen, a touch screen and a LED display; and the control device 104 may output processed data in form of image display data to the display for displaying, for example, analysis data and instrument operating parameters.

The communication interface 1044 may be an interface which supports any currently known communication protocol. The communication interface 1044 communicates with outside over a network. The control device 104 may communicate, through the communication interface 1044 and based on a communication protocol, data with any device connected over the network.

In an embodiment, the sample carrier 100 is a slide. In this embodiment, the sample may be, for example, peripheral blood, which forms a blood film on a slide; and the object whose image(s) is to be captured includes erythrocytes, leukocytes, blood platelets and so on in the peripheral blood. The sample may also be, for example, bone marrow, which forms a bone marrow smear on a slide. The bone marrow examination generally includes examination on cells of various mature stages, such as erythrocyte series, granulocyte series, lymphocyte series, monocyte series and plasmacytic series, and other cells such as megakaryocytes, reticular cells, phagocytes, endothelial cells and fat cells. For another example, the sample may be other excretions and secretions, which form a sample smear on a slide, and the object whose image(s) is to be captured includes, for example, cell components in a sample such as stool, vaginal secretion, seminal fluid, a prostatic fluid or sputum, and commonly includes erythrocytes, leukocytes, crystals, pathogenic microorganisms, epithelial cells, parasites, sperms, trichomonad, choline bodies of prostate, granular cells of prostate, alveolar macrophages, and tumor cells. Alternatively, the sample may be coelomic fluid, which forms a coelomic fluid smear on a slide, and the object whose image(s) is to be captured includes cell components in cerebrospinal fluid, serous cavity effusion, joint cavity effusion, and amniotic fluid, and commonly includes erythrocytes, leukocytes, leukocyte clusters, bacteria, yeast-like fungi, epithelial cells, parasites, etc. Alternatively, the sample may also be exfoliated cells, which form a sample smear on a slide, and the object whose image(s) is to be captured includes epithelial cells, mesothelial cells, cancer cells, erythrocytes, leukocytes, macrophages or tissue cells, a necrotic material (mucus, bacterial aggregate, fungal aggregate, plant cells, cotton fibers, dye residues, etc.), parasite, etc.

In another embodiment, the sample carrier 100 is a counting cell, the sample is urine which forms a urine sediment in the counting cell, and the object whose image(s) is to be captured includes urine formed elements, mainly including erythrocytes, leukocytes, leukocyte clusters, bacteria, yeast-like fungi, epithelial cells, small round epithelial cells, crystals, hyaline casts, non-hyaline casts, mucous filaments and the like commonly found in urine.

Based on the example of the sample image analyzer provided in FIGS. 1 to 3, a working process of capturing a cell image by the imaging device in the sample image analyzer according to an embodiment of the disclosure will be described below, and for convenience of understanding, the following embodiments are all described with a blood smear as the sample carrier, a blood film as the sample, and cells in the blood film as the object.

Figure 4:
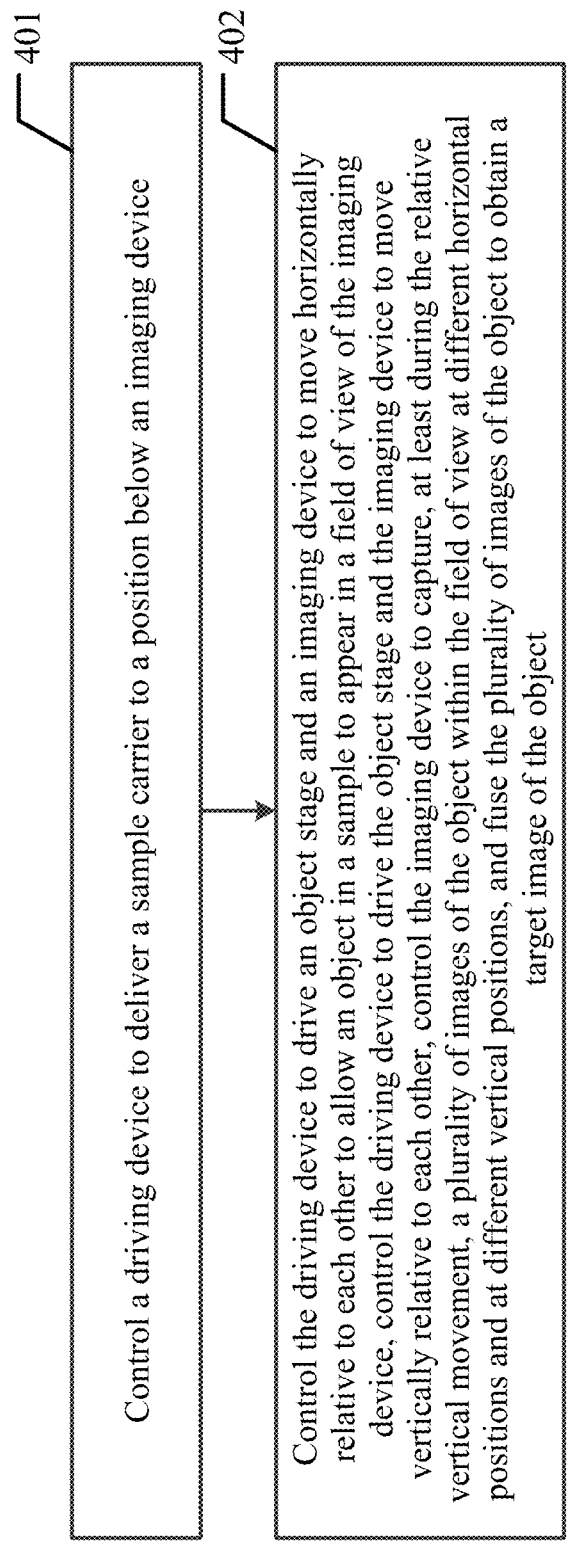
FIG. 4 is a schematic diagram of a method of a control flow of a control device according to an embodiment of the disclosure.

The control device 104 in the sample image analyzer establishes communication connection with the imaging device 102 and the driving device 103 through the communication interface 1044, and is configured to execute a control flow as shown in FIG. 4, which may specifically include steps 401-402.

Step 401: controlling driving device to deliver a sample carrier to a position below the imaging device.

Exemplarily, the control device may control the driving device to deliver the sample carrier to a position below the imaging device by means of a track rail, or control the driving device to deliver the sample carrier to a position below the imaging device by means of a mechanical arm. In practical applications, the way that the control device controls the driving device to deliver the sample carrier may be designed according to practical requirements, which is not specifically limited herein.

Step 402: controlling the driving device to drive the object stage and the imaging device to move horizontally relative to each other to allow at least one object in the sample to appear in a field of view of the imaging device, controlling the driving device to drive the object stage and the imaging device to move vertically relative to each other, and controlling the imaging device to capture, at least during the relative vertical movement, a plurality of images of the at least one object within the field of view at different horizontal positions and at different vertical positions; and fusing the plurality of images of the at least one object to obtain a target image of the at least one object.

When a sample carrier (a blood smear) is delivered to a position below the imaging device, the driving device may be further controlled to drive the object stage and the imaging device to move horizontally relative to each other to allow at least one cell in the blood film to appear in the field of view of the imaging device, the driving device may be controlled to drive the object stage and the imaging device to move vertically relative to each other, and the imaging device may be controlled to capture, at least during the relative vertical movement, a plurality of images of the object within the field of view at different horizontal positions and at different vertical positions. It will be understood that the relative horizontal movement between the object stage and the imaging device is intended to deliver each object in the sample carrier into the field of view of the imaging device, and the relative vertical movement is intended to capture images of the object within the field of view at different heights (layers).

It should be noted that the imaging device captures a plurality of images during the relative vertical movement between the imaging device and the object stage, during which the control device may drive the object stage and the imaging device to move horizontally relative to each other or stop driving the relative horizontal movement. That is to say, the imaging device may capture a plurality of images of the object only during the relative vertical movement, or may capture a plurality of images of the object during both the relative vertical movement and the relative horizontal movement, which may further be generally described as the imaging device capturing a plurality of images of the object at least during the relative vertical movement. Specifically, two cases in which the control device controls the imaging device to capture, at least during the relative vertical movement, a plurality of images of the object (such as cell) at different horizontal positions and at different vertical positions will be respectively described below.

I. At least one cell appears in the field of view of the imaging device in horizontal direction, the driving device stops driving the relative movement in horizontal direction, and begins to drive the relative movement in vertical direction.

The control device controls the driving device to drive the object stage and the imaging device to move horizontally relative to each other to allow at least one cell to appear in the field of view of the imaging device, controls the driving device to stop driving the relative horizontal movement and starts to control the driving device to drive relative vertical movement synchronously or after a short period of time. That is to say, at the time when the driving in horizontal direction is stopped or after a short period of waiting time, the control device starts driving vertically in order to capture a plurality of images. It may be understood that the purpose of the control device controlling the driving device to stop the relative horizontal movement is to stop the horizontal movement of the cell within the field of view. However, since factors, such as inertia, may cause that the relative horizontal movement between the object stage and the imaging device has stopped but the cell within the field of view of the imaging device has not yet completely stopped stably in horizontal direction (in a movement state), if cell images are captured after a long period of waiting time for allowing the cell to be in a stable state, it will inevitably increase the time required for image capturing and thus affect the working efficiency of the sample image analyzer. Therefore, according to the embodiments of the disclosure, a short period of waiting time can be set according to experience, and image capturing in vertical direction can also be performed in a state where the cell has not yet completely stopped. Thus, as the driving device drives the object stage and the imaging device to move vertically relative to each other, the plurality of images of the cell captured by the imaging device will include a plurality of images of the cell at different horizontal positions and at different vertical positions due to the fact that the cell within the field of view of the imaging device are in the movement state in both horizontal direction and vertical direction.

Figure 5A:
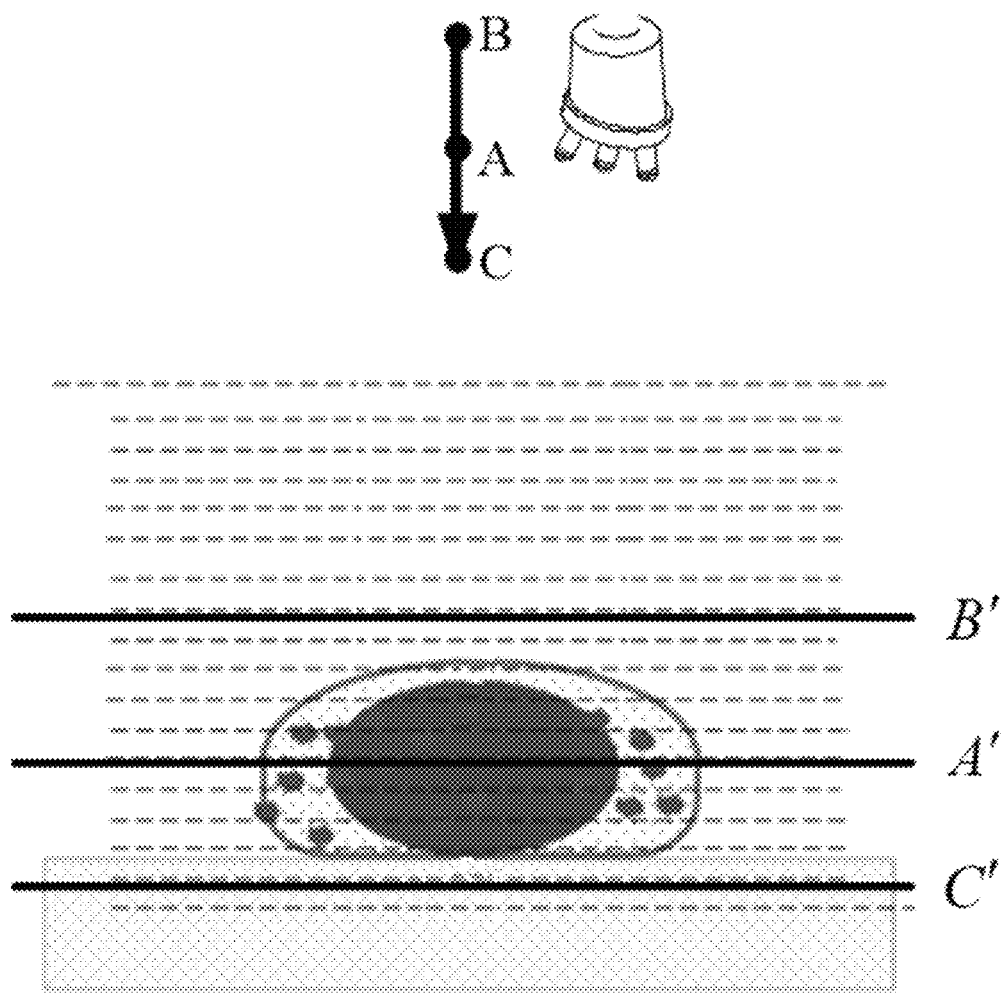
FIGS. 5A-5C are schematic diagrams of a scenario of capturing an image of an object by an imaging device according to an embodiment of the disclosure.
Figure 5B:
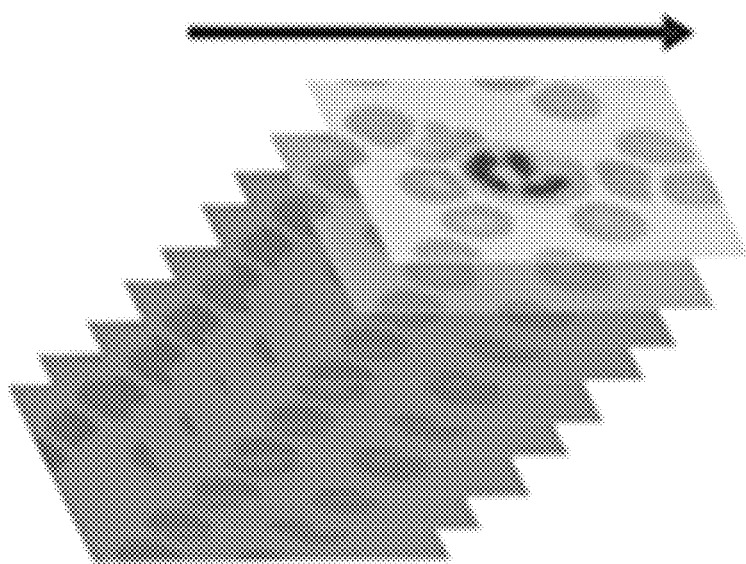

It should be noted that different horizontal positions of the images refer to different positions of different images of a same cell in a same coordinate system of the field of view; and different vertical positions of the images refer to images of a same cell at different heights (layers). With reference to FIGS. 5A and 5B, the vertical downward arrow in FIG. 5A indicates the relative movement direction of the imaging device and the object stage in vertical direction, the imaging device captures a plurality of images of a cell during the relative vertical movement from top to bottom, to obtain a plurality of images showing a tilted stacking effect as in FIG. 5B, wherein the plurality of images do not overlap in horizontal position indicated by the horizontal arrow to indicate that the horizontal positions of the plurality of images are different, and the plurality of images generate a stacking effect in vertical direction indicated by the vertical arrow to indicate that the plurality of images respectively correspond to different vertical heights of the cell, that is to say, the vertical positions of the plurality of images are different. In addition, the images of a cell captured by the imaging device during the relative vertical movement include images at different horizontal positions and at different vertical positions, and may also include images at a same horizontal position (equivalent to images captured after the cell is in a stable state in horizontal direction). Image fusion is performed at least according to the images at the different horizontal positions and at the different vertical positions to obtain a target image of the cell.

In this movement control mode, when the control device controls the driving device to stop driving the relative horizontal movement, the control device may control the driving device to drive the object stage and the imaging device to move vertically relative to each other without waiting for the cell within the field of view of the imaging device to completely stop in horizontal direction, so as to capture a plurality of images of the cell in different horizontal directions and in different vertical directions, thereby saving the capturing time of the imaging device and improving the working efficiency of the sample image analyzer.

II. At least one cell appears in the field of view of the imaging device in horizontal direction, the relative horizontal movement between the imaging device and the object stage is maintained, and the imaging device and the object stage are controlled to simultaneously move vertically relative to each other.

The control device controls the driving device to drive the object stage and the imaging device to move horizontally relative to each other to allow the cell to appear in the field of view of the imaging device. What is different from the above first case is that the driving device continues to keep driving the imaging device and the object stage to move horizontally relative to each other while driving the imaging device and the object stage to move vertically relative to each other such that the object stage and the imaging device move vertically relative to each other while moving horizontally relative to each other, so that the cell within the field of view of the imaging device is in the movement state in both horizontal direction and vertical direction. Therefore, during the relative horizontal movement and the relative vertical movement, cell images captured by the imaging device include a plurality of images at different horizontal positions and at different vertical positions.

Compared to the above first movement control mode, in the second movement control mode, the relative vertical movement is still performed while cell images are captured during the relative horizontal movement, which reduces the stop time in the relative horizontal movement direction, shortens the time for capturing the cell images, and thus achieves higher working efficiency of the sample image analyzer.

After obtaining the plurality of images of the cell, the control device fuses the plurality of images of the cell to obtain a target image of the cell. The specific fusion process of the cell images will be described in the following embodiments, which will not be described in detail herein.

In an existing sample image analyzer, when a cell appears in the field of view of the imaging device, it is needed to firstly stop the relative vertical movement, then focus the cell within the field of view, and capture cell images at and around a focus position after completing the focusing. Compared to the existing sample image analyzer which works in a mode of moving-stopping-focusing and capturing, the sample image analyzer of the embodiments of the disclosure does not need to stop the relative vertical movement and does not need to focus for cell images when capturing a plurality of images of the cell during the relative vertical movement, and optimizes the trajectory of image capturing. That is to say, in the prior art, it is necessary to firstly capture a cell image at the focus position, then capture a cell image at a preset position above the focus position, and then capture a cell image at a preset position below the focus position. However, the sample image analyzer of the embodiments of the disclosure can capture a plurality of images of a same cell in vertical direction according to a movement direction from top to bottom. In addition, according to the existing sample image analyzer, when the cell appears in the field of view of the imaging device, it is needed to stop driving the relative horizontal movement and wait for a long period of time such that the cell become stable in horizontal direction prior to image capturing in vertical direction. However, the sample image analyzer of the embodiments of the disclosure may not stop the relative horizontal movement or may wait for a relatively short period of time to shorten the time required for capturing cell images and improve the working efficiency of the sample image analyzer.

It should be noted that, according to the existing sample image analyzer, there may be a special case where the cell in the field of view is stable in position after waiting for a long time, but during the subsequent vertical movement, there is a slight difference in horizontal position of the cell images captured due to the tolerance of a driving mechanism. However, this case is essentially different from the movement control idea of the sample image analyzer of the embodiments of the disclosure, that is, the existing sample image analyzer is expected to make cell images stable in horizontal direction by means of waiting for a long time, while the sample image analyzer of the embodiments of the disclosure may capture images without waiting for the cell to be in a stable state. According to the existing sample image analyzer, different horizontal positions of the captured cell images will be considered to be a capturing error which will be ignored during fusion of the cell images. However, according to the sample image analyzer of the embodiments of the disclosure, different horizontal positions of the captured cell images are inevitably caused by a shorter period of waiting time, rather than a capturing error, and when fusing the cell images, a fused target image is obtained in consideration of the difference of the horizontal positions of the images.

In an embodiment, when controlling the imaging device and the object stage to move relative to each other, the control device may be specifically configured to, in the case where one of the imaging device and the object stage does not move, control a horizontal driving component to drive the other of the imaging device and the object stage to move horizontally to enable the object stage and the imaging device to move horizontally relative to each other, and control a vertical driving component to drive the other of the imaging device and the object stage to move vertically to enable the object stage and the imaging device to move vertically relative to each other.

Specifically, when controlling the imaging device and the object stage to move relative to each other, the control device may be configured to control the driving device to drive one of the imaging device and the object stage to move horizontally and vertically while maintaining the other of the imaging device and the object stage in no motion, so as to respectively achieve the relative horizontal movement and the relative vertical movement between the imaging device and the object stage. In this way, the driving device may achieve the relative movement between the imaging device and the object stage by only driving the imaging device or the object stage to move, which achieves simpler control mode and improves the practicability of the sample image analyzer, and the horizontal driving component and the vertical driving component can be integrated on a same driving object, so as to achieve higher degree of device integration of the sample image analyzer.

Based on the embodiment shown in FIG. 4, the process of capturing a plurality of images of an object of the imaging device will be described below from the perspective of object change in the sample, and may specifically include either of the following two implementations.

In a first implementation, when the field of view of the imaging device is changed from a first object to a second object, the horizontal driving component is controlled to stop driving the imaging device and the object stage to move horizontally relative to each other, and the vertical driving component is controlled to drive the object stage and the imaging device to move vertically relative to each other; and the imaging device is controlled to capture a plurality of images of the second object at different horizontal positions and at different vertical positions while stopping the relative horizontal movement and performing the relative vertical movement.

Specifically, if the field of view of the imaging device is changed from a first cell to a second cell when the imaging device captures images of the cell within the field of view, the horizontal driving component is controlled to stop driving the imaging device and the object stage to move horizontally relative to each other, and the vertical driving component is controlled to drive the object stage and the imaging device to move vertically relative to each other, and the imaging device is controlled to capture a plurality of images of the second cell at different horizontal positions and at different vertical positions while stopping the relative horizontal movement and performing relative vertical movement.

While stopping the relative horizontal movement and performing the relative vertical movement in this implementation, the second cell in the blood smear carried by the object stage has not yet completely stopped in horizontal direction within the field of view of the imaging device, that is to say, the second cell within the field of view of the imaging device is still in a movement state in horizontal direction, and meanwhile, the second cell within the field of view of the imaging device is also in a movement state in vertical direction, and therefore, while stopping the relative horizontal movement and performing the relative vertical movement, the imaging device may capture a plurality of images of the second cell at different horizontal positions and at different vertical positions.

In a second implementation, the horizontal driving component is controlled to continuously drive horizontally so as to enable the object stage and the imaging device to move horizontally relative to each other, and the vertical driving component is controlled to continuously drive vertically so as to enable the object stage and the imaging device to move vertically relative to each other; and the imaging device is controlled to capture a plurality of images of at least one object at different horizontal positions and at different vertical positions during the relative horizontal movement and the relative vertical movement.

Specifically, when the imaging device captures images of the cell within the field of view, if the field of view of the imaging device is changed from a first cell to a second cell, the control device may also control the vertical driving component to continuously drive vertically to enable the imaging device and the object stage to continuously move vertically relative to each other, and control the horizontal driving component to continuously drive horizontally to enable the imaging device and the object stage to continuously move horizontally relative to each other, that is, when the imaging device captures images of the cell, the imaging device and the object stage are continuously moved both horizontally and vertically relative to each other, and the imaging device captures a plurality of images of at least one cell at different horizontal positions and at different vertical positions during the continuous relative horizontal movement and the continuous vertical movement.

The second implementation is different from the first implementation in that the control device controls the object stage and the imaging device to continuously move both horizontally and vertically relative to each other, so that the imaging device captures a plurality of images of one or more cells at different horizontal positions and at different vertical positions during the continuous relative horizontal movement and the continuous vertical movement. Obviously, the second implementation reduces the stop time for the imaging device or the object stage in horizontal direction, so that the time for the imaging device to capture images of the cell within the field of view is shorter, and the capturing efficiency is also higher.

In the second implementation, the imaging device and the object stage are always in a state of continuously moving horizontally and vertically relative to each other, in order to ensure that the imaging device can capture at least one image of the cell in vertical direction, the control device needs to control a driving speed of the horizontal driving component and a driving speed of the vertical driving component such that a period of time that the cell is within the field of view of the imaging device is greater than or equal to a period of time for the imaging device to capture images of the cell in vertical direction.

In an implementation, the period of time that the cell is within the field of view of the imaging device may be calculated from a speed of the relative horizontal movement between the imaging device and the object stage and a length of the field of view of the imaging device in horizontal direction, and the period of time for the imaging device to capture images of the cell in vertical direction may be a fixed value or calculated from a movement distance and a movement speed of the relative vertical movement.

For convenience of understanding, this aspect is described with reference to an example. It is assumed that the imaging device is in a stationary state, the horizontal driving component drives the object stage to continuously move in horizontal direction, and the vertical driving component drives the object stage to continuously move in vertical direction; if the length of the field of view of the imaging device in horizontal direction is represented by L1, the speed of the horizontal driving component is represented by $V_{xy}$, the speed of the vertical driving component is represented by $V_z$, and the movement distance of the object stage in vertical direction is represented by L2, then $$\frac{L1}{V_{xy}} \geq \frac{L2}{V_z}$$

is met, so that the period of time for which the cell is within the field of view of the imaging device is greater than or equal to the period of time for the imaging device to capture images of the cell in vertical direction.

Preferably, in order to improve the capturing efficiency of images of all cells in the blood film, shorten the capturing time of images of all cells in the blood film, and also mitigate the shaking state of the cell within the field of view of the imaging device, the control device may be further configured to perform the following operations: while the object within the field of view of the imaging device is changed from a first object to a second object, controlling the horizontal driving component to drive at a first speed to move the field of view of the imaging device away from the first object, and to drive at a second speed to move the field of view of the imaging device close to the second object, wherein the first speed is greater than the second speed.

Specifically, in order to change the field of view of the imaging device from a first cell to a second cell as soon as possible in horizontal direction and save the time for capturing images of all cells, the control device needs to control the horizontal driving component to drive at a higher driving speed to rapidly move the field of view of the imaging device away from the first cell, and in order to mitigate the shaking state of the second cell in the imaging field of view, the control device needs to control the horizontal driving component to drive at a lower driving speed to slowly move the field of view of the imaging device close to the second cell. It should be noted that these higher and lower speeds are the results obtained by comparing the speeds in the two control processes. Therefore, while the field of view of the imaging device is changed from the first cell to the second cell, the horizontal driving component is firstly controlled to drive at the first speed V1 to move the field of view of the imaging device away from the first cell, and drive at the second speed V2 to move the field of view of the imaging device close to the second cell, where V1>V2.

Since the first speed is greater than the second speed, the need of changing the cell within the field of view of the imaging device from the first cell to the second cell as fast as possible is satisfied, and the need of mitigating the shaking state of the second cell within the field of view of the imaging device is also satisfied, so that the imaging device can capture cell image fast and stably.

In an embodiment, in order to make the imaging device capture at least one image of the cell in vertical direction, the control device may be further configured to control the speed of the vertical driving component, and thus the control device may be further configured to perform the following operations: controlling a movement distance by which the object stage and the imaging device are driven by the driving device to move vertically relative to each other within a period of time for capturing two consecutive images, to be less than or equal to a depth of field of the imaging device. Alternatively, a movement speed at which the object stage and the imaging device are driven by the driving device to move vertically relative to each other may be controlled according to the following formula: $V_{vertical} \times T <= P$, where $V_{vertical}$ represents the movement speed at which the object stage and the imaging device move vertically relative to each other, T represents the time required for the imaging device to capture one image, and P represents the depth of field of the imaging device.

In an embodiment, during capturing cell images by the imaging device, in order to enable the imaging device to capture cell images faster, the control device may be further configured to control a time of exposure of the camera in the imaging device such that the camera may complete capturing of one cell image as fast as possible. Therefore, the control device may be further configured to perform the following operations: controlling the time of exposure of the camera to be less than a movement time for which the imaging device and the object stage move vertically relative to each other during capturing two consecutive images. Preferably, the time of exposure of the camera is less than half of the movement time. It should be noted that during controlling the time of exposure of the camera, in order to satisfy the need of light brightness during capturing cell images, the capturing brightness may also be adjusted by means of adding an external light source to supplement light or adjusting the gain of the camera.

Based on the embodiment shown in FIG. 4, it is explained how the imaging device completes one moving capturing, and the moving capturing is repeated to achieve capturing of the whole sample carrier. Specifically, the one moving capturing of the imaging device includes: obtain a predicted focus position of an object whose image(s) is to be captured; determining a capturing start position and a capturing end position for the imaging device based on the predicted focus position; controlling the driving device to drive the object stage and the imaging device to move horizontally relative to each other, and controlling the driving device to drive the object stage and the imaging device to move vertically relative to each other, so as to allow the imaging device to move to the capturing start position of the object; and controlling, according to the capturing start position and the capturing end position of the object, the driving device to drive the object stage and the imaging device to move vertically relative to each other. In an implementation, when the capturing start position and the capturing end position for the imaging device are determined, a capturing position corresponding to the predicted focus position may be firstly determined according to the predicted focus position of the object (in other words, in order to capture a image of the object at the predicted focus position, it is necessary to determine a spatial position where the imaging device needs to be located), and the capturing position is then moved up and down in vertical direction to obtain the capturing start position and the capturing end position.

Specifically, obtaining the predicted focus position of the object whose image(s) is to be captured may be achieved based on either of the following two methods.

I. Before formal capturing, a focus function f (S, P) is established according to the own characteristics of the sample carrier to be detected, where S represents a horizontal position coordinate (X, Y) of a point to be captured, and P represents a focus parameter of the point to be captured. In this method, the horizontal position coordinate represents the relative positional relationship between the sample carrier to be detected and the imaging device in a horizontal plane, and the focus parameter may be a focus distance (focus height). The predicted focus position of the object whose image(s) is to be captured is then obtained according to the horizontal position coordinate of the object and the focus function, and the predicted focus position here may also be expressed by the focus distance (focus height).

In addition, it should be noted that the characteristics of a sample on the sample carrier to be detected may include the own characteristics of the sample, such as parameter results of blood routine test of the sample, and may also include characteristics such as the appearance and thickness of the sample formed on the sample carrier.

Exemplarily, a plurality of reference points may be selected from a sample region of the current sample carrier to be detected to predict the focus parameters of all points to be captured. For example, horizontal position coordinates (X, Y) of at least three reference points in the sample region of the current sample carrier to be detected and focus parameters of the at least three reference points under the imaging device are obtained; a focus plane characterization function of the current sample carrier to be detected is established according to the horizontal position coordinates of at least three reference points and focus parameters.

In some embodiments, determining the focal plane characterization function of the sample carrier to be detected according to the horizontal position coordinates and the focus parameters of the at least three reference points includes: solving a plane equation $a*X+b*Y+c*Z+d=0$ according to the horizontal position coordinates and the focus heights of the at least three reference points to obtain a predicted focus plane, where X and Y represent the horizontal position coordinates, Z represents the focus heights, and a, b, c and d represent coefficients to be solved of the plane equation.

In some embodiments, the number of the at least three reference points is greater than 10.

Figure 6:
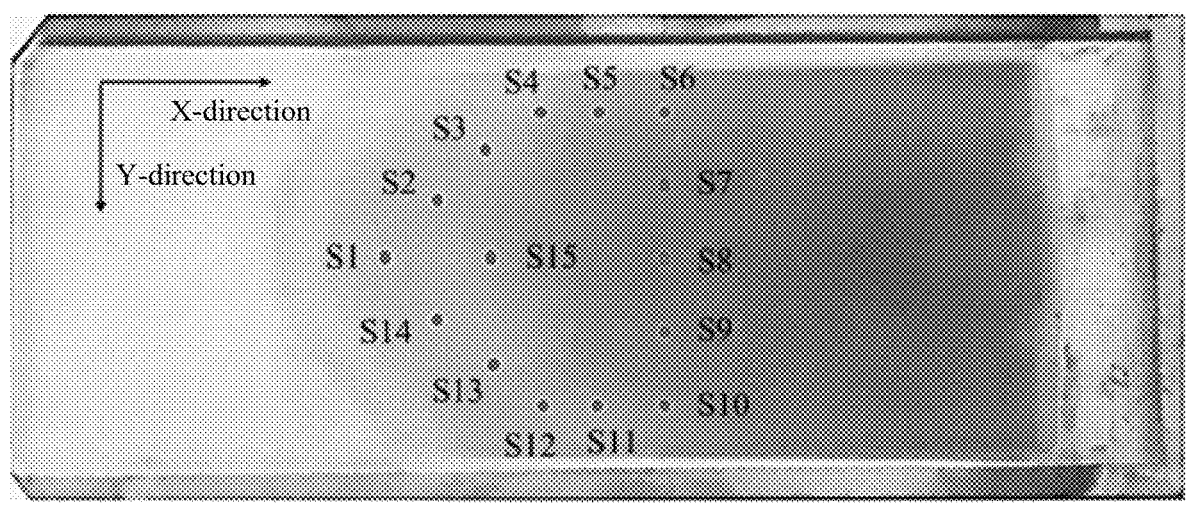
FIG. 6 is a schematic diagram of selecting reference points by a control device according to an embodiment of the disclosure.
Figure 7:
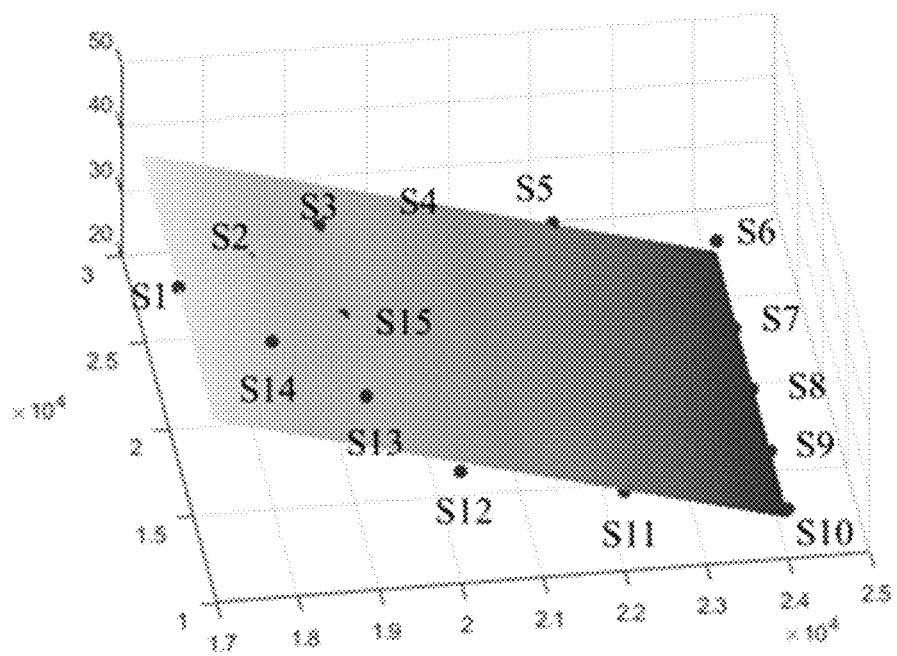
FIG. 7 is a schematic diagram of determining a focus plane according to an embodiment of the disclosure.

Taking a blood smear as the sample carrier to be detected as an example, as shown in FIG. 6, firstly, a plurality of reference points, such as 15 reference points S1 to S15, are selected from a blood sample region of the blood smear, where the positions (horizontal position coordinates) of the reference points are settable. The blood smear is then moved horizontally relative to the imaging device such that each of the 15 reference points stops within the field of view of the imaging device, and the imaging device focuses the 15 reference points respectively and records the focus position or focus height (focus distance) of each reference point. A focus plane of the whole blood smear is then fitted according to the horizontal position coordinates and the focus positions of these 15 points, and the focus plane is obtained as shown in FIG. 7, thereby predicting the focus position of any cell in the whole blood smear based on the focus plane.

It will be understood that a predicted focus plane may also be a fitted surface.

II. Before formal capturing, a focus function f (S, P) is established according to the own characteristics of the sample carrier to be detected, where S represents a horizontal position coordinate (X, Y) of a point to be captured, and P represents a focus parameter of the point to be captured. In this method, the horizontal position coordinate represents the relative positional relationship between the sample carrier to be detected and the imaging device in a horizontal plane, and the focus parameter may be a focus distance (focus height). Specifically, the process of determining the focus function f (S, P) is similar to the process described above in the first method, which will not be described in detail herein.

The second method is different from the first method of determining a focus function by preselecting a preset number of reference points, in that, after the imaging device captures image(s) of a new object (such as a cell), the control device will correct the predetermined focus function in real time according to the focus distance (focus height) of said object, and then uses the corrected focus function and the horizontal position coordinate of the object whose image is to be captured to obtain the predicted focus position of said object. Each cell captured by this method may take part during determining the focus function such that the determined focus function can more accurately predict a predicted focus position of the next cell. This method may be referred to as dynamically determining the focus function. Further, some cells, instead of each cell, may be selected to take part in the correction process so as to obtain a better balance between image capturing efficiency and improving prediction accuracy.

After the predicted focus position of the object whose image is to be captured is obtained using any of the above methods, the capturing start position and the capturing end position for the imaging device are determined based on the predicted focus position. It should be noted that since a cell has a certain thickness in vertical direction, in order to capture a plurality of images of the cell at different vertical directions, it is preferable to determine the capturing start position and the capturing end position for the imaging device based on the predicted focus position.

Specifically, when determining the capturing start position and the capturing end position for the imaging device, the control device generally determines the capturing start position and the capturing end position according to the predicted focus position and the height of the object whose image(s) is to be captured. It is assumed that the capturing position corresponding to the predicted focus position A' in vertical direction is represented by A, and the height of the object whose image(s) is to be captured is represented by H' and may be a value predetermined according to an object type and capturing experience. In order to capture images of the whole object to be captured at different vertical heights, the capturing start position is generally represented by A−H (H represents a capturing distance corresponding to the cell height H', that is, a distance by which the imaging device needs to move for capturing the cell of the height H'), and the capturing end position is represented by A+H.

With reference to FIG. 5A, the vertical downward arrow indicates that the imaging device and the object stage move vertically relative to each other from top to bottom. It is assumed that the predicted focus position of the cell is represented by A', the capturing position A of the imaging device is determined according to the predicted focus position A', the capturing start position B and the capturing end position C are determined based on the capturing position A, the imaging device firstly moves to the capturing start position B, then captures a plurality of images of the cell during the vertically-downward relative movement until the capturing end position C is reached, and stops capturing. It will be understood that the path from the capturing start position B to the capturing end position C may be regarded as a capturing stroke of the imaging device, and a layer B' indicates a cell image captured by the imaging device at the capturing start position B, and a layer C' indicates a cell image captured by the imaging device at the capturing start position C. The positions of the layer B' and the layer C' are merely illustrative and may be located at other positions of the cell depending on actual capturing circumstances.

During actual image capturing, there may be an error in the predicted capturing stroke due to the influence of factors such as the difference of height values of the object whose image(s) is to be captured, a movement error of the driving device during movement, and a surface error caused by an uneven surface of the sample carrier, and therefore, after the capturing start position and the capturing end position are determined, the capturing start position and the capturing end position of the object whose image(s) is to be captured may be corrected based on at least one of a preset height value of the object, a preset movement error and a surface error of the sample carrier, so as to improve the accuracy of the capturing stroke.

After the capturing start position is determined, the object stage and the imaging device are driven to move horizontally relative to each other, and the object stage and the imaging device are driven to move vertically relative to each other, such that the imaging device moves to the capturing start position of the object whose image(s) is to be captured, and the driving device is then controlled to drive the object stage and the imaging device to move vertically relative to each other from the capturing start position to the capturing end position, allowing the imaging device to capture images during the relative vertical movement.

In order to further improve the efficiency of capturing the cell images, during the control of the relative vertical movement between the object stage and the imaging device, the control device may be also configured to perform the following operations: if a trend of change in focusing degree of the object in the images captured by the imaging device during the relative vertical movement shows continuous decrease, controlling the vertical driving component to stop driving in vertical direction.

Figure 5C:
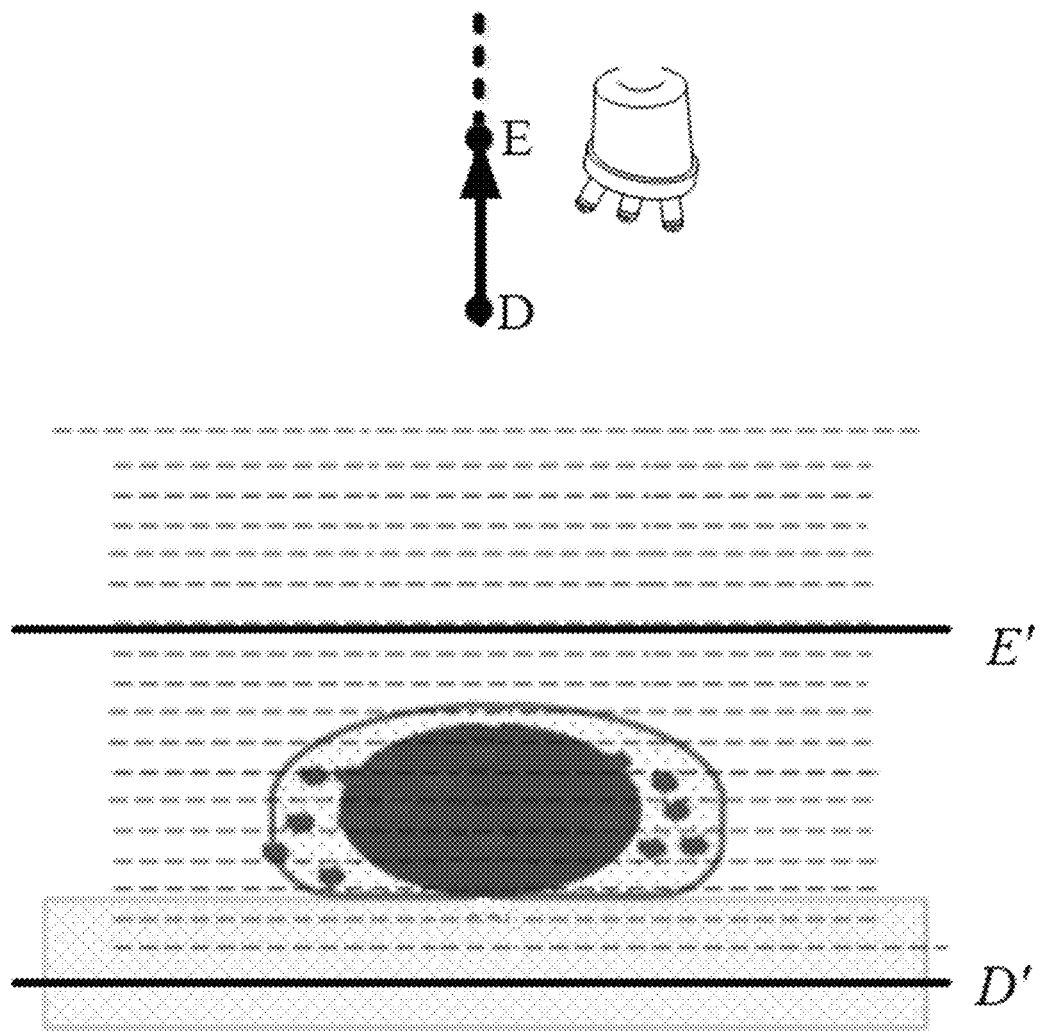

It will be readily understood that, in order to decrease the number of invalid images (images containing no object or images containing no clear object) captured by the imaging device in vertical direction during the vertical movement driven by the vertical driving component, it is possible to detect the trend of change in focusing degree of the object in a plurality of images when the imaging device is controlled to capture the plurality of images in vertical direction, and control the vertical driving component to stop driving in vertical direction when the trend of change shows continuous decrease. The condition for the continuous decrease may be set according to actual capturing requirements, such as the number of continuous decreases exceeding a preset number threshold or the degree of continuous decrease exceeding a preset degree threshold. Since a continuous decrease in focus degree may indicate that clarity of cell images becomes poor, and the capturing may be stopped to improve the capturing efficiency. With reference to FIG. 5C, the vertical upward arrow indicates the movement direction that the imaging device and the object stage move vertically relative to each other, and it is assumed that a capturing start position D is determined, the imaging device starts to capture a plurality of images of a cell from the capturing start position D. The trend of change in focusing degree of a plurality of consecutive images is detected, and it is assumed that the detected trend of change corresponding to a capturing position E shows continuous decrease, the control device may control the driving device to stop driving at the capturing position point E, and the relative vertical movement between the imaging device and the object stage will stop in advance. In FIG. 5C, a layer D' indicates the cell image captured by the imaging device at the capturing start position D, and a layer E' indicates the cell image captured by the imaging device at the capturing position E. It should be noted that the positions of the layer D' and the layer E' are merely illustrative and may be located at other positions of the cell depending on actual capturing circumstances. In this case, it is possible to set only a capturing start point and no capturing end point.

The process of fusing the plurality of images of the object is described below. In an embodiment, the image fusion may specifically include: grouping a plurality of images of at least one object to obtain an image set corresponding to a same object; and fusing the images in the image set of the same object to obtain a target image of the same object.

Since the imaging device may capture a plurality of images of a plurality of objects when capturing images of the at least one object, before the plurality of images of the objects are fused, the plurality of images of at least one object needs to be grouped to obtain an image set corresponding to the same object.

After the image set of the same object is obtained, all the images in the image set of the same object may be fused. Alternatively, M images containing cell characteristics may be selected from N images of the image set of the same object, and the M images are fused to obtain a target image of the object. The images containing cell characteristics are selected for fusion, so that the images with very blurred cell characteristics can be removed, making the fusion more efficient.

When selecting M images containing cell characteristics from N images, it may be considered to select M images containing cell characteristics with better capturing effect, where the better capturing effect may include any one or more of the following cases: image is clear, image texture is complex, image boundary is clear, color contrast is large, a cell preset position is included and the like, in order to improve the image fusion efficiency and the effect of the target image obtained by fusion.

The process of fusing a plurality of images containing cell characteristics by the control device will be described in detail below. In a specific implementation, when fusing the plurality of images of the object, the control device is specifically configured to perform the following steps: calculating, with one of the plurality of images of the object as a reference image, the offsets of other images from the reference image; and fusing the reference image and other images of the object based on the offsets to obtain the target image of the object.

Specifically, after the plurality of images of the same object is obtained and before fusing the plurality of images, in order to make fusion portions of the cell in the plurality of images overlap with one another (or aligned with one another), one image of the plurality of images of the same object may be used as the reference image, the offsets of other images from the reference image are calculated, and target regions in other images are extracted according to the offsets, wherein the target regions refer to image regions containing the object. Then, the target regions extracted from the reference image and other images are fused to obtain the target image of the same object.

Figure 8:
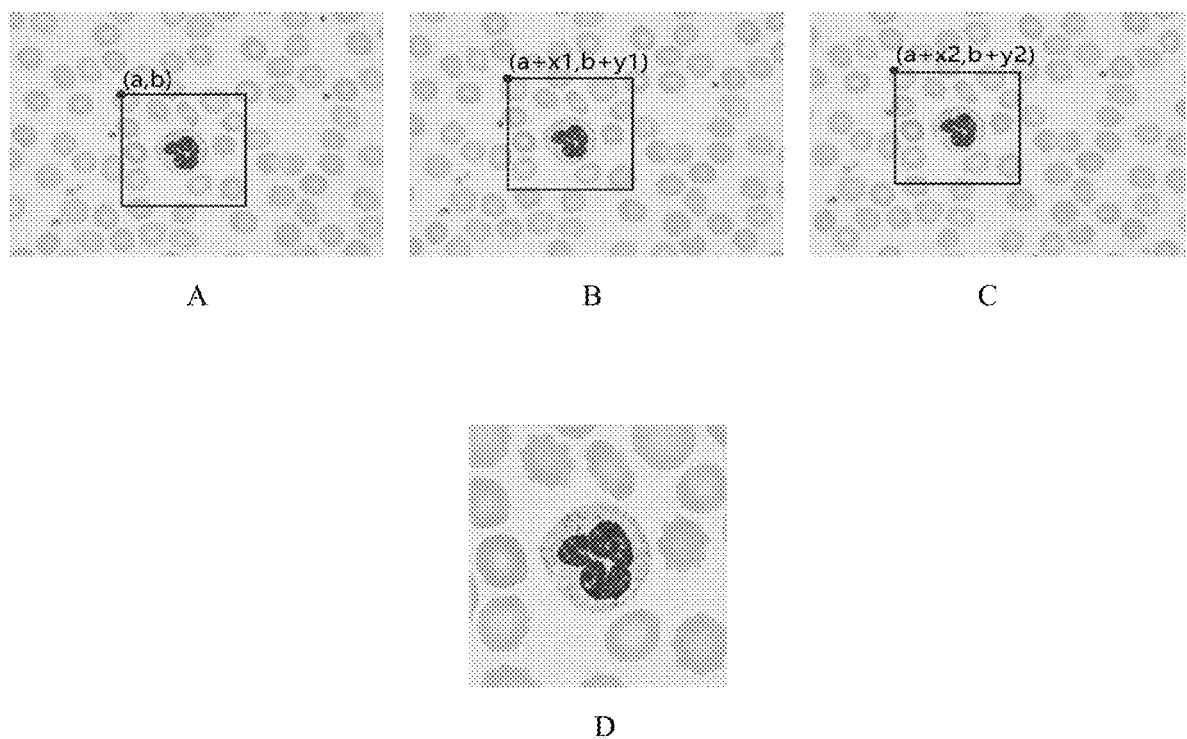
FIG. 8 is a schematic diagram of a process for fusing cell images according to an embodiment of the disclosure.

For convenience of understanding, the process of fusing cell images is described, with cell images in FIG. 8 as an example: it is assumed that image A in FIG. 8 is the reference image, and the position of the reference image is represented by the coordinate point (a, b) of the upper left corner of the target region, a first offset (x1, y1) of the position of image B with regard to the position of image A is calculated, a second offset (x2, y2) of the position of image C with regard to image A is calculated, then images of a same position containing the cell in image B and image C are then extracted according to the first offset and the second offset, meanwhile, an image of the same position containing the cell in image A is extracted, and the extracted images of the same region containing the cell are finally fused to obtain fused target image D.

In order to save time for the imaging device to capture images of the cell, the control device may be also configured to control the trajectory of the relative movement between the object stage and the imaging device. Based on the embodiment shown in FIG. 4, the relative movement between the object stage and the imaging device controlled by the control device will be described below.

Figure 9A:
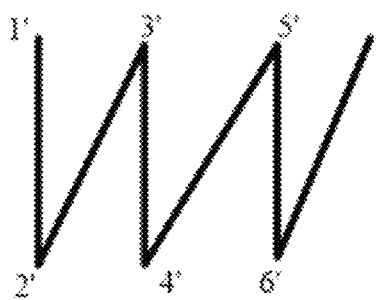
FIGS. 9A-9B are schematic diagrams of two movement trajectories of an object stage according to an embodiment of the disclosure.

In an embodiment, the driving device may be controlled to drive the object stage and the imaging device to move vertically relative to each other and move horizontally relative to each other, and then to move vertically relative to each other again, wherein the generated movement trajectory may be referred to as a zigzag movement trajectory or an oblique-wave movement trajectory. As shown in FIG. 9A, it is assumed that the control device keeps the imaging device stationary and controls the object stage to move while controlling the object stage and the imaging device to move relative to each other, after the object stage is moved from point 1' to point 2' in vertical direction and the imaging device completes first image capturing, the control device controls the object stage to move obliquely from point 2' to point 3' so as to change the object within the field of view of the imaging device, controls the object stage to move from point 3' to point 4' in vertical direction to complete second image capturing, controls the object stage to move obliquely from point 4' to point 5' so as to change the object within the field of view of the imaging device, and then controls the object stage to move from point 5' to point 6' in vertical direction so as to complete third image capturing, thereby completing image capturing of all objects in the blood film by cyclically repeating this process.

In another embodiment, the driving device may be controlled to drive the object stage and the imaging device to change back and forth for the relative vertical movement and the relative horizontal movement, and a generated movement trajectory may be referred to as a serpentine movement trajectory or a square-wave movement trajectory. Specifically, the driving device may be controlled to drive the object stage and the imaging device to move vertically relative to each other in a first direction to capture a plurality of images of a first object, and to move horizontally relative to each other for changing to a second object, and then to move vertically relative to each other in a second direction to capture a plurality of images of the second object, wherein the first direction and the second direction are opposite.

Figure 9B:
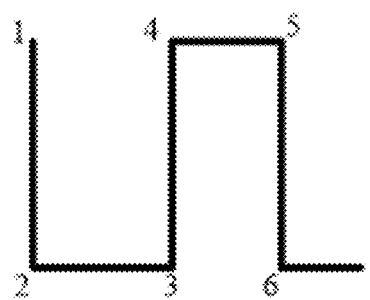

Exemplarily, as shown in FIG. 9B, it is assumed that the control device keeps the imaging device stationary and controls the object stage to move while controlling the object stage and the imaging device to move relative to each other, after the object stage moves from point 1 to point 2 in vertical direction and the imaging device completes first image capturing, the control device controls the object stage to move from point 2 to point 3 in horizontal direction so as to change the object within the field of view of the imaging device, controls the object stage to move from point 3 to point 4 in vertical direction to complete second image capturing, controls the object stage to move from point 4 to point 5 in horizontal direction so as to change the object within the field of view of the imaging device, and then controls the object stage to move from point 5 to point 6 in vertical direction so as to complete third image capturing, thereby completing image capturing of all objects in the blood film by cyclically repeating this process.

In the embodiment of the disclosure, the control device controls the object stage and the imaging device to move vertically and horizontally relative to each other in a square-wave form, which, compared to controlling the object stage and the imaging device to move vertically and horizontally relative to each other in an oblique-wave form, saves the time for cell change in the imaging device, and improves the image capturing efficiency.

Figure 10:
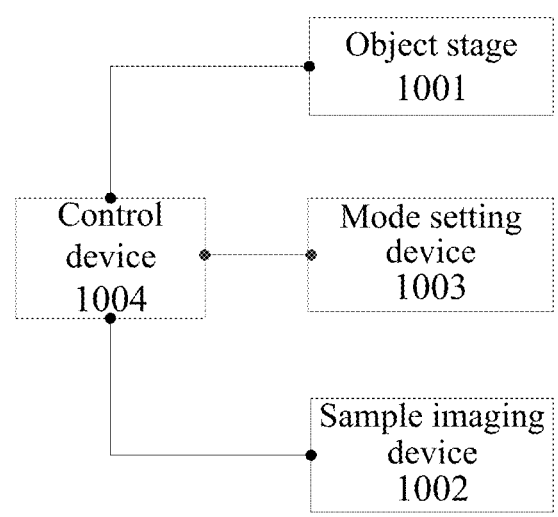
FIG. 10 is another schematic structural diagram of the sample image analyzer according to an embodiment of the disclosure.

An embodiment of the disclosure further provides a sample image analyzer having at least two capturing modes, and the sample image analyzer will be described with reference to FIG. 10. Specifically, an embodiment of the disclosure provides a sample image analyzer, including:

an object stage 1001 configured to support a sample carrier;

a sample imaging device 1002 configured to capture an image of an object in a sample carried by the sample carrier;

a mode setting device 1003 configured to set one of a first capturing mode and a second capturing mode as an operation mode in which the sample imaging device and the object stage move relative to each other and the sample imaging device performs capturing. Optionally, the mode setting device 1003 in the sample image analyzer according to the embodiment of the disclosure is an interactive device that establishes communication connection with a control device 1004 via a communication interface and is configured to achieve interaction between a user and the control device. The user may input an operation instruction of a capturing mode, such as an operation instruction of the first capturing mode or an operation instruction of the second capturing mode, to the control device by means of the mode setting device 1003;

a control device 1004 configured to receive an operation mode instruction of the first capturing mode, control the sample imaging device to capture a plurality of images of a same object at a same horizontal position and at different vertical positions and fuse the plurality of images of the same object to obtain a target image of the object, or configured to receive an operation mode instruction of the second capturing mode, control the sample imaging device to capture a plurality of images of at least one object at different horizontal positions and at different vertical positions, and fuse the plurality of images of the at least one object to obtain a target image of the at least one object.

In one case, when the control device receives the operation mode instruction of the first capturing mode, the control device controls the imaging device to capture a plurality of images of a same object at a same horizontal position and at different vertical positions. As an example, an application scenario of the first capturing mode is as follows: it is assumed that the imaging device is in a stationary state during control, the relative movement between the object stage and the imaging device is achieved by means of controlling the movement of the object stage. The control device controls the driving device to drive the object stage to move horizontally, and after a sample object in the sample carrier support by the object stage appears in the field of view of the imaging device, the control device controls the driving device to stop driving in horizontal direction, and when the sample object is in a stable state within the field of view of the imaging device (that is, the sample object and the imaging device are in a relatively stationary state in horizontal direction), the control device controls the driving device to drive the object stage to start to move in vertical direction, such that the imaging device captures a plurality of images of the same object at the same horizontal position while at different vertical positions, and fuses the plurality of images of the same object. For the specific fusion process, reference is made to the relevant description in the forgoing embodiments, which will not be described in detail herein. Those skilled in the art would understand that, capturing a plurality of images at different vertical positions may be firstly capturing an image of a focus plane and then capturing images near the focus plane by vertically moving up and down, or may be capturing, in one direction, a plurality of consecutive images in vertical direction. The latter one is higher in speed but requires more precise control.

In another case, when the control device receives the operation mode instruction of the second capturing mode, the control device controls the imaging device to capture a plurality of images of at least one object at different horizontal positions and at different vertical positions. Exemplarily, an application scenario of the second capturing mode is as follows: the control device controls the driving device to drive the object stage to move horizontally, and after a sample object in the sample carrier supported by the object stage enters the field of view of the imaging device, the control device controls the driving device to stop driving in horizontal direction, and when the sample object is not in a stable state within the field of view of the imaging device (that is, the sample object and the imaging device are in a relative movement state in horizontal direction), the control device controls the driving device to drive the object stage to start to move in vertical direction. At this moment, there is not only a relative horizontal movement but also a relative vertical movement between the sample object within the field of view of the imaging device and the imaging device. Thus, the imaging device is capable of capturing a plurality of images of the same object at different horizontal positions and at different vertical positions.

In addition, an application scenario of the second capturing mode may also be described as follows: the control device controls the driving device to drive the object stage to continuously move horizontally while controlling the driving device to drive the object stage to continuously move vertically, and controls the imaging device to continuously capture a sample object within the field of view when the sample object enters the field of view of the imaging device. Because the sample object within the field of view of the imaging device and the imaging device are in a state of continuously moving horizontally and vertically relative to each other, the imaging device can capture a plurality of images of at least one object at different horizontal positions and at different vertical positions.

After the imaging device captures the plurality of images of the at least one object, the control device fuses the plurality of images of the at least one object to obtain the target image of the at least one object. With regard to the process of fusing the plurality of images of the at least one object, reference may be made to the relevant descriptions of the previous embodiments, and the description thereof will not be repeated herein.

Specifically, the sample imaging device 1002 in this embodiment also includes a lens set and a camera. During capturing cell images by the camera, in order to shorten the capturing time of the camera for each cell image and improve the capturing efficiency of the camera for each cell image, the control device is further configured to control a time of exposure of the camera to be less than a movement time of the relative vertical movement between the imaging device and the object stage during continuously capturing two images, and preferably, the time of exposure of the camera is less than half of the above-described movement time.

During controlling the time of exposure of the camera, in order to satisfy the need of light brightness during capturing cell images, the capturing brightness may also be adjusted by adding an external light source or adjusting the gain of the camera.

Other descriptions about the control flow of the control device are similar to the relevant content described above and will not be repeated herein.

Also, based on the structure example of the sample image analyzer shown in FIG. 10, another sample image analyzer having two capturing modes according to an embodiment of the disclosure will be described next from the perspective of sample object change. Specifically, the sample image analyzer includes:

an object stage 1001 configured to support a sample carrier;

a sample imaging device 1002 configured to capture an image of an object in a sample carried by the sample carrier;

a mode setting device 1003 configured to set one of a third capturing mode and a fourth capturing mode as an operation mode that the sample imaging device and the object stage move relative to each other and the sample imaging device performs capturing, the mode setting device being described with reference to the above description, which will not be repeated herein; and a control device 1004 configured to receive an operation mode instruction of the third capturing mode and, when an object within a field of view of the sample imaging device is changed from a first object to a second object, control the sample imaging device and the object stage to stop moving horizontally relative to each other, control the sample imaging device and the object stage to move vertically relative to each other, and control the sample imaging device to capture a plurality of images of the second object during the relative vertical movement; or configured to receive an operation mode instruction of the fourth capturing mode and, when an object in the field of view of the sample imaging device is changed from a first object to a second object, control the sample imaging device and the object stage to continue to move horizontally relative to each other, control the sample imaging device and the object stage to move vertically relative to each other, and control the sample imaging device to capture a plurality of images of the second object during the relative horizontal movement and the relative vertical movement.

Exemplarily, when the control device receives the operation mode instruction of the third capturing mode, an application scenario is as follows: it is assumed that the sample imaging device is in a stationary state during control, the relative movement between the object stage and the sample imaging device is achieved by controlling the movement of the object stage. The control device controls the driving device to drive the object stage to move horizontally relative to the sample imaging device, and when the sample object within the field of view of the sample imaging device is changed from the first object to the second object, controls the driving device to stop driving the object stage horizontally, then controls the object stage to move vertically relative to the sample imaging device, and controls the sample imaging device to capture a plurality of images of the second object during the relative vertical movement.

"Stopping driving the object stage horizontally" is described in two cases:

I. After the driving device is controlled to stop the object stage horizontally, the object stage is controlled to move vertically relative to the sample imaging device after a period of waiting time that is less than a preset threshold, wherein the preset threshold is used to define change of the object within the field of view of the imaging device from a shaking state to a stable state in horizontal direction. It should be noted here that the relative horizontal movement is achieved by driving the object stage to move and controlling the imaging device to be stationary, and the relative horizontal movement may also be achieved by interchanging the movement modes of the two or by moving both the object stage and the sample imaging device.

In the first case, after the object stage is controlled to stop being driven horizontally, the sample object in the sample carrier supported by the object stage is not in a stable state within the field of view of the sample imaging device, that is, the sample object in the sample carrier supported by the object stage is still in a movement state in horizontal direction within the field of view of the sample imaging device, and the object stage is then controlled to move vertically relative to the sample imaging device; because the sample object in the sample carrier supported by the object stage is in the movement state in both horizontal direction and vertical direction within the field of view of the sample imaging device, the plurality of images of the second object captured by the sample imaging device during the relative vertical movement are a plurality of images at different horizontal positions and at different vertical positions. In this mode that starting moving and capturing vertically without waiting for the object to be stable, by means of a later image processing, the sample image analyzing speed of the sample image analyzer can be improved while the image quality is ensured, which is better than a mode that performing capturing after the object is stable.

II. After the driving device is controlled to stop driving the object stage horizontally, the object stage is controlled to move vertically relative to the sample imaging device after a period of waiting time that is greater than or equal to the preset threshold, wherein the preset period of time is used to define change of the object within the field of view of the imaging device changes from a shaking state to a stable state in the horizontal direction. It should be noted here that the relative horizontal movement is achieved by driving the object stage to move and controlling the imaging device to be stationary, and the relative horizontal movement may also be achieved by interchanging the movement modes of the two or by moving both the object stage and the sample imaging device.

In the second case, after the object stage is controlled to stop being driven horizontally, the sample object in the sample carrier supported by the object stage is in a stable state within the field of view of the sample imaging device, that is, the sample object in the sample carrier supported by the object stage is in a stationary state in horizontal direction within the field of view of the sample imaging device, and the object stage is then controlled to move vertically relative to the sample imaging device; because the sample object in the sample carrier supported by the object stage is in the stationary state in horizontal direction and in the movement state in vertical direction within the field of view of the sample imaging device, the plurality of images of the second object captured by the sample imaging device during the relative vertical movement are a plurality of images at a same horizontal position and at different vertical positions.

In a practical application, the third capturing mode is often used for capturing cells such as leukocytes, erythrocytes, or blood platelets which require clearer images.

Exemplarily, when the control device receives the operation mode instruction of the fourth capturing mode, an application scenario is as follows: when the sample object within the field of view of the sample imaging device is changed from the first object to the second object, the control device controls the driving device to drive the object stage to continuously move horizontally and move vertically relative to the sample imaging device, and controls the sample imaging device to capture a plurality of images of the second object during the relative vertical movement.

In the fourth capturing mode, since the object stage and the sample imaging device are in a state of continuously moving horizontally and vertically relative to each other, the sample object within the field of view of the sample imaging device is always in the relative horizontal movement state and in the relative vertical movement state, and the plurality of images of the second object captured by the sample imaging device are a plurality of images of the second object at different horizontal positions and at different vertical positions. The fourth capturing mode is different from the third capturing mode in that, since the object stage and the sample imaging device are in a state of continuously moving horizontally and vertically relative to each other, the process of capturing images of the object in the sample by the sample imaging device is shorter.

After obtaining the plurality of images of the second object, the control device fuses the plurality of images of the second object to obtain a target image of the second object. The process of fusing the second images is similar to those described in the embodiments above and will not be described again herein.

In a practical application, the fourth capturing mode is often used in a scenario of blood platelet aggregation detection, and in such a scenario, the region to be captured is often relatively large, but the requirement for cell definition is not very high.

Figure 11:
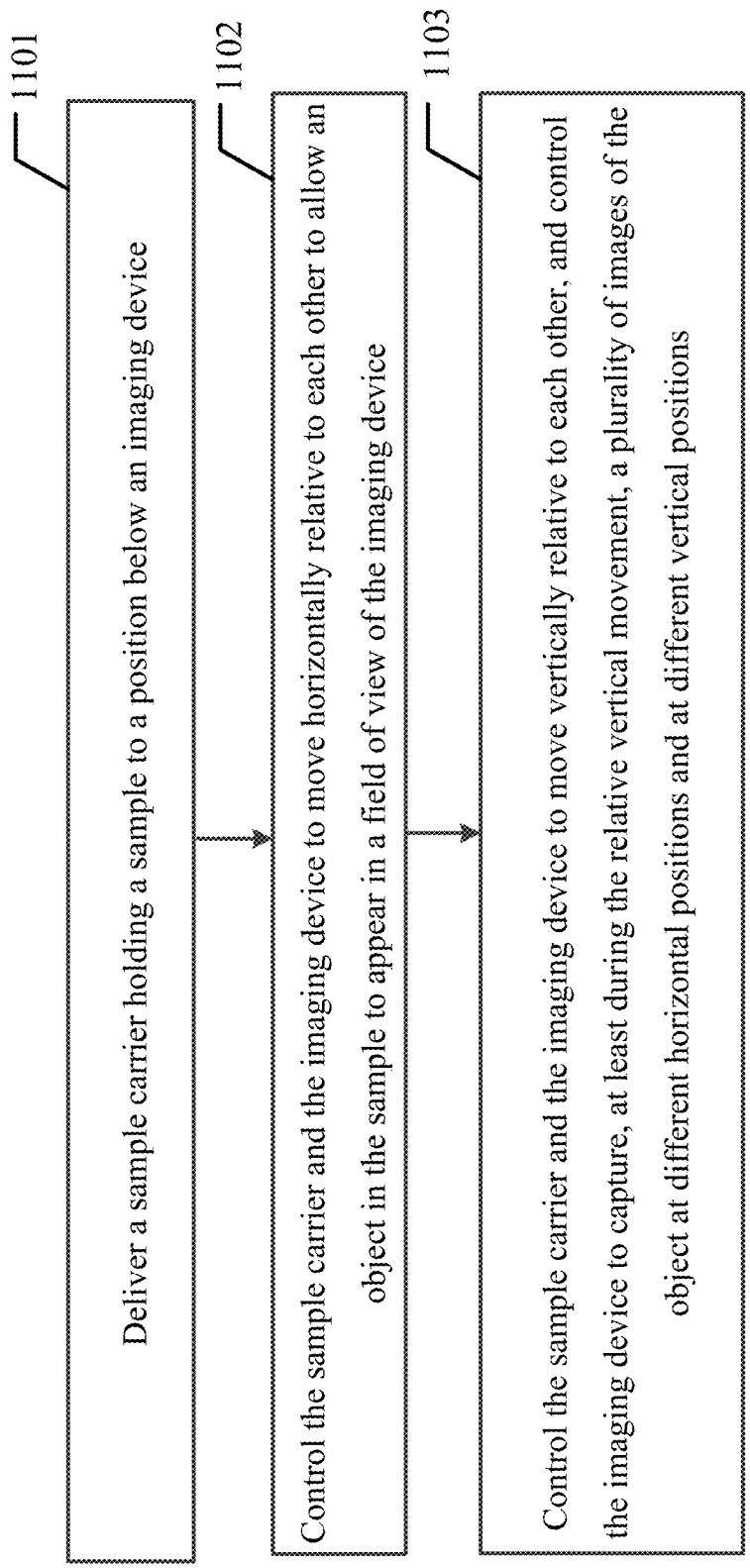
FIG. 11 is a schematic flowchart of a sample image analyzing method according to an embodiment of the disclosure.

The sample image analyzers according to the embodiments of the disclosure are described above, and a sample image analyzing method of a sample image analyzer will be described below. With reference to FIG. 11, an embodiment of the sample image analyzing method of the sample image analyzer includes:

1101, delivering a sample carrier holding a sample to a position below an imaging device;

1102, controlling the sample carrier and the imaging device to move horizontally relative to each other to allow an object in the sample to appear in a field of view of the imaging device;

1103, controlling the sample carrier and the imaging device to move vertically relative to each other, and controlling the imaging device to capture, at least during the relative vertical movement, a plurality of images of the object at different horizontal positions and at different vertical positions; and fusing the plurality of images of the object to obtain a target image of the object.

The description of the above steps is similar to the description of the control flow of the control device in the above embodiment, which will not be repeated here.

Since the plurality of images of the object captured by the imaging device at least during the relative vertical movement at different horizontal positions and at different vertical positions are a plurality of images captured when the sample object is in a shaking state (that is, in a state that the sample object is stopped but not stably stopped) or a movement state in horizontal direction within the field of view of the imaging device, and the sample object is also in a movement state in vertical direction within the field of view of the imaging device; compared with the case in the prior art that requires the sample object to be in a stable state in horizontal direction and in a movement state in vertical direction within the field of view of the imaging device, the time for allowing the sample object to stop or stably stop in horizontal direction is reduced, the time for capturing cell images is shorter, and the capturing efficiency is higher according to the embodiments of the disclosure.

Figure 12:
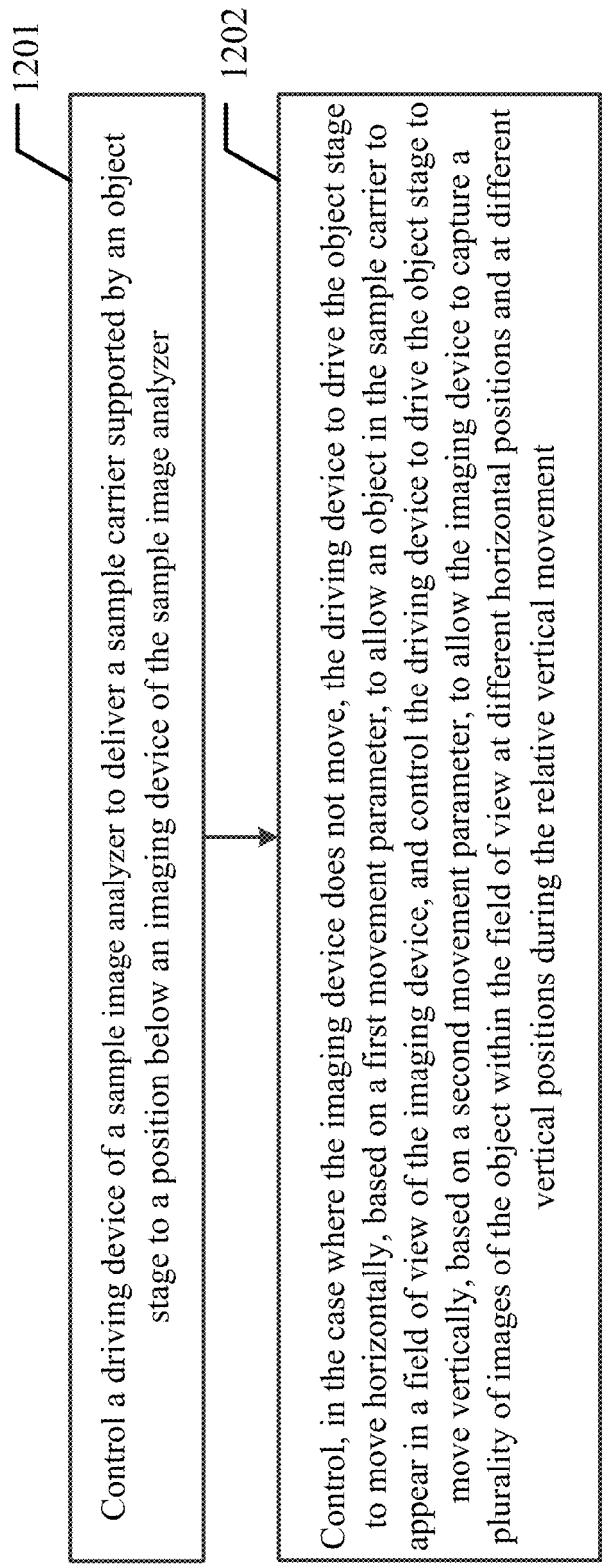
FIG. 12 is a schematic flowchart of a control method for a object stage of a sample image analyzer according to an embodiment of the disclosure.

Next, the control method for the object stage of the sample image analyzer is described below, with reference to FIG. 12, an embodiment of the control method for the object stage of the sample image analyzer includes:

1201, controlling a driving device of the sample image analyzer to deliver a sample carrier supported by the object stage to a position below an imaging device of the sample image analyzer; and 1202, controlling, in the case where the imaging device does not move, the driving device to drive the object stage to move horizontally, based on a first movement parameter, to allow an object in the sample carrier to appear in a field of view of the imaging device, and controlling the driving device to drive the object stage to move vertically, based on a second movement parameter, to allow the imaging device to capture a plurality of images of the object within the field of view at different horizontal positions and at different vertical positions during the relative vertical movement.

Preferably, the first movement parameter includes a movement speed of the object that appearing in the field of view of the imaging device and/or a movement speed of the object within the field of view of the imaging device, and the second movement parameter includes a movement distance by which the imaging device moves vertically within a period of time for capturing two consecutive images.

Specifically, in order to facilitate the control of the relative movement between the imaging device and the object stage, the imaging device may be controlled not to move, the driving device is controlled to drive the object stage to move horizontally based on the first movement parameter to allow the object in the sample carrier to appear in the field of view of the imaging device, and the driving device is controlled to drive the object stage to move vertically based on the second movement parameter to allow the imaging device to capture a plurality of images of the object within the field of view at different horizontal positions and at different vertical positions during the relative vertical movement, wherein the first movement parameter includes the movement speed of the object entering the field of view of the imaging device and/or the movement speed of the object within the field of view of the imaging device, and the second movement parameter includes the movement distance by which the imaging device moves vertically within the period of time for capturing two consecutive images.

Specifically, when the object is controlled to enter the field of view of the imaging device, in order to rapidly complete the capturing of cell images, the driving device may be controlled to drive at a first speed to move the field of view of the imaging device away from the first object, and drive at a second speed to move the field of view of the imaging device close to the second object, wherein the first speed is greater than the second speed.

Meanwhile, when the object appears in the field of view of the imaging device, the driving speed of the driving device is controlled such that a period of time for the object appears in the field of view is greater than or equal to a period of time for which the imaging device vertically captures image(s) of the object.

Further, a movement distance by which the object stage and the imaging device are driven by the driving device to move vertically relative to each other within a period of time for capturing two consecutive images is controlled to be less than or equal to a depth of field of the imaging device.

Since the imaging device is maintained stationary in the embodiment of the disclosure, the driving device drives the object stage to move in horizontal direction and vertical direction, it is possible to integrate the driving device on the object stage, thereby not only improving the integration of apparatus of the sample image analyzer, but also improving the practicability of apparatus with a simple control mode.

Those skilled in the art would have clearly understood that for convenience and conciseness of description, the specific working processes of the above-described systems, devices and units may refer to the corresponding processes in the above-described embodiments of the method and will not be further described herein.

In several embodiments provided in the disclosure, it should be understood that the disclosed systems, devices and methods could be implemented in other ways. For example, the device embodiments described above are merely exemplary. For example, the division of units is only a logic function division. In actual implementation, there may be other division methods, for example, multiple units or assemblies may be combined or integrated into another system, or some features may be omitted or not implemented. In addition, the mutual coupling or direct coupling or communication connection shown or discussed may be indirect coupling or communication connection through some interfaces, devices or units, and may be in electrical, mechanical or other forms.

The units described as separate parts may or may not be physically separated, and the parts displayed as units may or may not be physical units, that is, may be located in one place, or may be distributed over multiple network units. Some or all of the units can be selected according to actual needs to achieve the objectives of solutions of the embodiments.

Additionally, the functional units in the embodiments of the disclosure may be integrated into one processing unit or may also exist as being physically separate, or two or more of the units may be integrated into one unit. The integrated units described above may be implemented in the form of hardware or software function units.

If the integrated unit is implemented in the form of the software function units and sold or used as an independent product, it may be stored in a computer-readable storage medium. Based on such an understanding, the technical solution of the disclosure essentially, or a part contributing to the prior art, or all or part of the technical solution may be embodied in the form of a software product. The computer software product is stored in a storage medium and includes several instructions to cause a computer apparatus (which may be a personal computer, a server, a network apparatus, etc.) to execute all or some steps of the method described in the embodiments of the disclosure. The foregoing storage medium includes: a USB disk, a removable hard disk, read-only memory (ROM), a random access memory (RAM), a magnetic disk or an optical disk and other media that can store program codes.

As described above, the above embodiments are merely used for illustrating rather than limiting the technical solution of the disclosure. Although the disclosure has been illustrated in detail with reference to the foregoing embodiments, it should be understood by those of ordinary skill in the art that modifications can still be made to the technical solution described in the foregoing embodiments or equivalent substitutions of some technical features thereof are also possible, while these modifications or substitutions do not cause the essence of the corresponding technical solution to depart from the spirit and scope of the technical solutions of the embodiments of the disclosure.

What is claimed is:

1. A sample image analyzer, comprising:
an object stage configured to support a sample carrier;
an imaging device comprising a lens set and a camera and configured to capture an image of an object in a sample carried by the sample carrier;
a driving device configured to drive the object stage and the imaging device to move relative to each other;
a control device, which establishes communication connection with the imaging device and the driving device and is configured to control the driving device to deliver the sample carrier to a position below the imaging device, wherein the control device is further configured to: control the driving device to drive the object stage and the imaging device to move horizontally relative to each other, to allow at least one object in the sample to appear in a field of view of the imaging device; control the driving device to drive the object stage and the imaging device to move vertically relative to each other; control the imaging device to capture, at least during the relative vertical movement, a plurality of images of the at least one object within the field of view at different horizontal positions and at different vertical positions; and fuse the plurality of images of the at least one object to obtain a target image of the at least one object.

2. The sample image analyzer of claim 1, wherein the control device is further configured to:
control, in the case where one of the imaging device and the object stage does not move, the driving device to drive the other of the imaging device and the object stage to move horizontally to allow the object stage and the imaging device to move horizontally relative to each other, and control the driving device to drive the other of the imaging device and the object stage to move vertically to allow the object stage and the imaging device to move vertically relative to each other.

3. The sample image analyzer of claim 1, wherein the control device is further configured to:
control, when the object within the field of view of the imaging device is changed from a first object to a second object, the driving device to stop driving the imaging device and the object stage to move horizontally relative to each other, and control the driving device to drive the object stage and the imaging device to move vertically relative to each other; and
control the imaging device to capture a plurality of images of the second object at different horizontal positions and at different vertical positions while stopping the relative horizontal movement and performing the relative vertical movement.

4. The sample image analyzer of claim 1, wherein the control device is further configured to:
control the driving device to continuously drive the object stage and the imaging device to move horizontally relative to each other, and control the driving device to continuously drive the object stage and the imaging device to move vertically relative to each other; and
control the imaging device to capture a plurality of images of at least one object at different horizontal positions and at different vertical positions during the relative horizontal movement and the relative vertical movement.

5. The sample image analyzer of claim 4, wherein when controlling the driving device to continuously drive horizontally, the control device is further configured to:
control, while the object within the field of view of the imaging device is changed from a first object to a second object, the driving device to drive at a first speed to move the field of view away from the first object, and drive at a second speed to move the field of view close to the second object, wherein the first speed is greater than the second speed.

6. The sample image analyzer of claim 4 or 5, wherein when fusing the plurality of images of the at least one object, the control device is further configured to:
group a plurality of images of at least one object to obtain an image set corresponding to said object; and
fuse the images in the image set of said object.

7. The sample image analyzer of claim 4, wherein the control device is further configured to:
control, when the at least one object appears in the field of view of the imaging device, a driving speed of the driving device, such that a period of time for which the object appears in the field of view is greater than or equal to a period of time for which the imaging device vertically captures image(s) of the object; and
control the imaging device to capture a plurality of images of the object at different horizontal positions and at different vertical positions during the relative horizontal movement and the relative vertical movement.

8. The sample image analyzer of claim 1, wherein when controlling the driving device to drive the object stage and the imaging device to move vertically relative to each other, the control device is further configured to:
obtain a predicted focus position of an object whose image(s) is to be captured;
determine a capturing start position and a capturing end position for the imaging device based on the predicted focus position;
control the driving device to drive the object stage and the imaging device to move horizontally relative to each other, and control the driving device to drive the object stage and the imaging device to move vertically relative to each other, so as to allow the imaging device to move to the capturing start position of the object; and
control, based on the capturing start position and the capturing end position of the object, the driving device to drive the object stage and the imaging device to move vertically relative to each other.

9. The sample image analyzer of claim 8, wherein when determining a capturing start position and a capturing end position for the imaging device based on the predicted focus position, the control device is further configured to:
correct the capturing start position and the capturing end position of the object based on a preset correction value to obtain a corrected capturing start position and a corrected capturing end position of the object, wherein the correction value includes at least one of a preset height value of the object, a preset movement error, and a surface error of the sample carrier.

10. The sample image analyzer of claim 1, wherein when controlling the driving device to drive the object stage and the imaging device to move vertically relative to each other, the control device is further configured to:
control a movement distance by which the object stage and the imaging device move vertically relative to each other within a period of time for capturing two consecutive images, to be less than or equal to a depth of field of the imaging device.

11. The sample image analyzer of claim 1, wherein the control device is further configured to:
control a time of exposure of the camera to be less than a movement time for which the imaging device and the object stage move vertically relative to each other while capturing two consecutive images.

12. The sample image analyzer of claim 1, wherein when controlling the driving device to drive the object stage and the imaging device to move vertically relative to each other, the control device is further configured to:
control the driving device to stop driving vertically if a trend of change in focusing degree of the object in the images captured by the imaging device during the relative vertical movement shows a continuous decrease.

13. The sample image analyzer of claim 1, wherein when fusing the plurality of images of the at least object to obtain a target image of the at least object, the control device is further configured to:
select M images from N images of the object, wherein M is less than N, and the M images contains cell characteristics, and fuse the M images to obtain a target image of the object.

14. The sample image analyzer of claim 1, wherein when fusing the plurality of images of the at least object to obtain a target image of the at least object, the control device is further configured to:
calculate, with one of the plurality of images of the at least object as a reference image, offsets of other images from the reference image; and
fuse the reference image and other images of the at least object based on the offsets to obtain the target image of the at least object.

15. The sample image analyzer of claim 1, wherein when controlling the driving device to drive the object stage and the imaging device to move horizontally relative to each other and controlling the driving device to drive the object stage and the imaging device to move vertically relative to each other, the control device is further configured to:
control the driving device to drive the object stage and the imaging device to move vertically relative to each other in a first direction to capture a plurality of images of a first object, and then to move horizontally relative to each other to change to a second object, and then move vertically relative to each other in a second direction to capture a plurality of images of the second object, wherein the first direction is opposite to the second direction.

16. A sample image analyzer, comprising:
an object stage configured to support a sample carrier;
a sample imaging device configured to capture an image of an object in a sample carried by the sample carrier;
a mode setting device configured to set one of a first capturing mode and a second capturing mode as an operation mode in which the sample imaging device and the object stage move relative to each other and the sample imaging device performs capturing; and
a control device configured to receive an operation mode instruction of the first capturing mode, control the sample imaging device to capture a plurality of images of a same object at a same horizontal position and at different vertical positions, and fuse the plurality of images of the same object to obtain a target image of the same object; or configured to receive an operation mode instruction of the second capturing mode, control the sample imaging device to capture a plurality of images of at least one object at different horizontal positions and at different vertical positions, and fuse the plurality of images of the at least one object to obtain a target image of the at least one object.

17. The sample image analyzer of claim 16, wherein the sample imaging device comprises a lens set and a camera, and the control device is further configured to:
control a time of exposure of the camera to be less than a movement time for which the imaging device and the object stage move vertically relative to each other while capturing two consecutive images.

18. A sample image analyzer, comprising:
an object stage configured to support a sample carrier;
a sample imaging device configured to capture an image of an object in a sample carried by the sample carrier;
a mode setting device configured to set one of a third capturing mode and a fourth capturing mode as an operation mode in which the sample imaging device and the object stage move relative to each other and the sample imaging device performs capturing; and
a control device configured to receive an operation mode instruction of the third capturing mode and, when an object within a field of view of the sample imaging device is changed from a first object to a second object, control the sample imaging device and the object stage to stop moving horizontally relative to each other, control the sample imaging device and the object stage to move vertically relative to each other, and control the sample imaging device to capture a plurality of images of the second object during the relative vertical movement; or configured to receive an operation mode instruction of the fourth capturing mode and, when an object in a field of view of the sample imaging device is changed from a first object to a second object, control the sample imaging device and the object stage to continue to move horizontally relative to each other, control the sample imaging device and the object stage to move vertically relative to each other, and control the sample imaging device to capture a plurality of images of the second object during the relative horizontal movement and the relative vertical movement.

19. The sample image analyzer of claim 18, wherein the sample imaging device comprises a lens set and a camera, and the control device is further configured to:
control a time of exposure of the camera to be less than a movement time for which the imaging device and the object stage move vertically relative to each other while capturing two consecutive images.

20. The sample image analyzer of claim 18, wherein when controlling the sample imaging device and the object stage to stop moving horizontally relative to each other, and controlling the sample imaging device and the object stage to move vertically relative to each other, the control device is further configured to:
stop driving the sample imaging device and the object stage to move horizontally relative to each other, and after a period of waiting time that is less than a preset threshold, control the sample imaging device and the object stage to move vertically relative to each other; or
stop driving the sample imaging device and the object stage to move horizontally relative to each other, and after a period of waiting time that is greater than or equal to the preset threshold, control the sample imaging device and the object stage to move vertically relative to each other, wherein the preset threshold is used to define change of the object within the field of view of the imaging device from a shaking state to a stable state in horizontal direction.

* * * * *